(12) United States Patent
Gaitas

(10) Patent No.: US 8,297,837 B1
(45) Date of Patent: Oct. 30, 2012

(54) METAL AND SEMIMETAL SENSORS NEAR THE METAL INSULATOR TRANSITION REGIME

(75) Inventor: Angelo Gaitas, Ann Arbor, MI (US)

(73) Assignee: Angelo Gaitas, Ann Arbor, MI (US)

( * ) Notice: Subject to any disclaimer, the term of this patent is extended or adjusted under 35 U.S.C. 154(b) by 196 days.

(21) Appl. No.: 12/798,273

(22) Filed: Apr. 1, 2010

(51) Int. Cl.
*G01K 7/00* (2006.01)

(52) U.S. Cl. .......................... 374/185; 257/53
(58) Field of Classification Search .................. 257/418, 257/53; 374/179, 183, 185, 142, 44, 114
See application file for complete search history.

(56) References Cited

U.S. PATENT DOCUMENTS

| | | | |
|---|---|---|---|
| 2006/0052504 A1* | 3/2006 | Xia et al. | 524/440 |
| 2008/0019122 A1* | 1/2008 | Kramer | 362/154 |
| 2010/0133536 A1* | 6/2010 | Syllaios et al. | 257/53 |

* cited by examiner

*Primary Examiner* — Ha Tran T Nguyen
*Assistant Examiner* — Vongsavanh Sengdara

(57) ABSTRACT

This invention generally relates to sensors made of granular thin films in the discontinuous phase. More particularly, the invention relates to microbolometers and displacement sensors fabricated from thin films that are close to the metal insulator transition (MIT) or metal semiconductor transition (MST) regime. Sensors of various designs have been fabricated according to the invention and may be used for deflection measurements, nano-indentation, visco-elastic measurements, topographical scanning, explosive detection, low abundance biomolecular detection, electromagnetic radiation detection and other similar detection and measurement systems.

10 Claims, 27 Drawing Sheets

METAL AND SEMIMETAL SENSORS NEAR THE METAL INSULATOR TRANSITION REGIME

TECHNICAL FIELD OF THE INVENTION

This invention generally relates to sensors made of granular metallic or semimetallic thin films in the discontinuous phase. More particularly, the invention relates to uncooled microbolometers and displacement sensors fabricated from thin films that are close to the metal insulator transition (MIT) or metal semiconductor transition (MST) regime.

BACKGROUND OF THE INVENTION

Monitoring devices with embedded infrared sensors and detectors are frequently used for video surveillance of people and premises, fire detection, emergency responses, and various other applications where there is a need for such sensors and detectors. Detectors generally operate by detecting the differences in the thermal radiance of various objects in a particular scene. These differences in thermal radiation are converted into electrical signals which are processed, analyzed, and displayed as images in the case of video imager's and noise signals for detectors.

The use of bolometers as infrared detectors and imagers are well known in the art. In many cases the sensor array is a microbolometer array. When a microbolometer array absorbs infrared radiation of objects and their surroundings, there is a corresponding change in electrical resistance generated by a change in the microbolometer temperature. When used as an infrared detector or imager, the change in electrical resistance of the bolometer material resulting from the temperature change due to absorption of infrared radiation, is measured and recorded. Bolometers and microbolometers therefore generally act as resistive thermometers.

Cooled microbolometer detectors are costly to fabricate, heavier in weight, have shorter lifetimes, low yields, and consume considerably more power than uncooled microbolometers. Besides being lighter in weight, the uncooled microbolometers are cheaper to fabricate and consume less power than the cooled microbolometers. Uncooled microbolometers are currently used in the manufacture of highly specialized thermal imaging applications such as night vision and Scanning Thermal Microscopy (SThM) [1, 2, 3]. Two types of SThM microbolometers have shown considerable promise: Doped silicon microbolometers with temperature coefficient of resistance (TCR) between 0.003/K and 0.0056/K that are integrated into single-crystal silicon cantilevers [10, 11], and metallic microbolometers with a TCR around 0.0029/K [12].

The effective operation of microbolometers as infrared sensors and detectors requires them to have a high temperature coefficient of resistance (TCR) and low noise characteristics. The temperature coefficient of resistance (TCR) or $\alpha$ is the ratio of increased conductor resistance per degree Celcius rise in temperature of the conductor material. A material with a large value of TCR provides the best sensing capability. A higher sensitivity material is required to achieve the larger values of TCR. With pure metals, the TCR is a positive number because the resistance of these metals increases with increasing temperatures. Therefore, when bolometers and more particularly, microbolometers are used as infrared imagers to measure electromagnetic radiation emitted by surrounding objects, the efficiency of these imagers depend to a large extent on the metal used in the imagers. Lower resistivity bolometer film materials often have lower TCR values.

Microbolometers are generally fabricated on a substrate material using integrated circuit fabrication techniques. Adequate signal-to-noise ratio is essential for image processing and display. The signal to noise ratio as well as the response time and sensitivity of the bolometer depends on the thermal mass and thermal isolation from the supporting structure. The response time of a microbolometer is the time required for a detector to absorb sufficient infrared radiation to change the electrical resistance of the detector element accompanied by the dissipation of heat generated by the absorption of the infrared radiation. Microbolometer sensitivity on the other hand is determined by the amount of infrared radiation necessary to cause sufficient change in the electrical property of the microbolometer detector. With increase in thermal mass there is a decrease in sensitivity and increase in response time. Therefore, the thicker, the bolometer film material, the poorer, the overall performance of the imager.

The common semiconductor materials used in microbolometers are vanadium oxide ($VO_x$) amorphous silicon (a-Si), and titanium oxide (TiOx). Some of the earlier bolometers used vanadium oxide as the semiconductor material (U.S. Pat. No. 5,450,053). Vanadium oxide has a TCR of approximately, 0.05/K and a superior noise equivalent temperature difference (NETD). However, vanadium oxide introduces a significant number of deposition problems [6,7,8]. U.S. Pat. No. 6,836,677 discloses a bolometer with a TCR higher than the conventional bolometers. The bolometer according to this disclosure uses a thin film of a crystalline or polycrystalline oxide selected from alkaline and rare earth elements, and one or more elements belonging to Period 5 or Period 6 of the Periodic Table. Polycrystalline and amorphous silicon have a high TCR of up to 0.05/K, but exhibit adverse noise characteristics [4,5,6]. In addition, microbolometers fabricated from vanadium oxides ($VO_x$) and amorphous silicon (a-Si) have been shown to exhibit permanent changes in their electrical properties and in some cases mechanical deformation with a rise in temperature, even if temporary, resulting in changes in TCR values. The use of pure titanium and its alloys result in a bolometer that occupies a significant amount of space as described in U.S. Pat. No. 5,698,852. U.S. Pat. No. 7,442,933 discloses a bolometer that has substantially high resistance stability and substantially low 1/F noise. The bolometer in this patent comprises a substrate and a TiOx layer formed over the substrate, where the x value of the TiOx layer is in the range of 1.68 to 1.95.

Microbolometers have to be fabricated at temperatures compatible with Complementary Metal-Oxide-Semiconductor (CMOS) technology. In addition, the materials used to manufacture microbolometers must be inexpensive and compatible with current CMOS processes. Thin film metallic microbolometers have very low noise characteristics in addition to a low TCR of 0.005/K [6,9]. Thin film metallic microbolometers have other important advantages as well, including, simplified fabrication and a lower manufacturing cost. Metallic microbolometers also enable the use of alternative substrate materials such as polymers that tend to exhibit higher compliance properties and improved thermal isolation for better temperature resolution. U.S. Pat. No. 7,527,999 discloses the manufacture of a microbolometer film material $Cd_{1-x}Zn_xS$, with a TCR in the value ranges from 1.5% to 3.7% for use at temperatures compatible with CMOS technology.

As a metal film is being deposited, the electrical properties of granular metals vary continuously as the composition of metal and non-metal mixtures is changed [13]. Metal deposition goes through the following four phases before it starts behaving like a bulk film. The first phase is nucleation which is the clustering of atoms and molecules. During nucleation, the film is highly susceptible to environmental and deposition conditions and substrate surface conditions. The second phase is island formation where stable nuclei grow and appropriate other nuclei. The third phase is when the islands combine to form networks of a few islands in contact with each other. This phase along with the first two phases are considered discontinuous. Finally, the film becomes continuous, but porous as some channels between the networks get filled [14-17]. Typically, island films have negative TCR while porous films have a positive TCR like bulk materials. The TCR for porous films is lower than that of thick bulk film [14, 15, 18, 19, 20]. Unlike bulk films, ultrathin films are comprised of a series of metal islands or grains, rather than a continuous film. The transport between films is due to tunneling or hopping. A small change in distance between the grains due to bending, results in a large change in resistance of the film. Accordingly, the gauge factor of these films is higher. In the present invention, cantilever sensors for sensing bending include metal sensors based on discontinuous films.

The primary conditions that have to be met as part of the continuing effort to develop, smaller, better performing microbolometers that weigh less and consume less power are, high temperature coefficient of resistance (TCR), low noise, inexpensive material, and compatibility with current Complementary Metal-Oxide-Semiconductor (CMOS) processes. The microbolometer of the present invention is fabricated taking into consideration these conditions and fills the deficiency gap for these conditions in the prior art.

An object of the present invention is to present the design of suspended beam sensors made of granular metallic, metal oxides such as, indium oxide, tin oxide, zinc oxide, or semimetallic thin films in the discontinuous phase. These sensors are used either as bolometers or as displacement sensors for sensing movement. Another object of the present invention is to present fabrication methods for these sensors from thin films that are close to the metal insulator transition (MIT) regime.

SUMMARY OF THE INVENTION

This invention generally relates to sensors made of granular metallic or semimetallic thin film in the discontinuous phase. More particularly, the invention relates to uncooled microbolometers and displacement sensors fabricated from thin films that are close to the metal insulator transition (MIT) or the metal semiconductor transition (MST) regime. In this disclosure the MIT regime and thickness are defined as the thickness where the I-V curve crosses over from sublinear to superlinear, and TCR transitions from positive to negative. Therefore, near the MIT regime there is a zero value of TCR and a high negative value of TCR both of which are of interest. The gauge factor for sensing displacement is also very large.

In one embodiment, intended for scanning thermal microscopy (SThM), an ultrathin film (<20 nm) titanium microbolometer integrated onto a SiO2/Si3N4/SiO2 (ONO) cantilever with a Si/SiO2 tip has been fabricated. Wafers with different thicknesses of titanium were also prepared and tested. The morphology of these metal thin films (discontinuous form versus continuous form) [18] is revealed by measuring their electrical properties and atomic force microscopy imaging. Titanium thin film properties near the MIT regime improve the sensitivity of metal microbolometers. Sheet resistances corresponding to the highest TCR and the lowest TCR, in absolute values have been determined. The relationship between TCR and resistance may be typical for many metal, metal oxides, and semimetal thin films near room temperatures. Applications of metal, metal oxides or semimetal films with resistance thicknesses near the MIT can be extended to infrared imaging and chemical sensing. Another object of this invention is to present the design of suspended beam sensors made of granular metallic or semimetallic thin film in the discontinuous phase. These sensors are used either as bolometers or as sensors for sensing movement.

These and other features of the present invention will become obvious to one skilled in the art through the description of the drawings, detailed description of the invention, and the appended claims.

BRIEF DESCRIPTION OF THE DRAWINGS

FIG. 1 b illustrates titanium resistors on a wafer.

FIG. 7 b illustrates six different designs.

DETAILED DESCRIPTION OF THE INVENTION

The object of the present invention is to provide a method for fabrication of an uncooled microbolometer from thin films of metals and semimetals close to the metal insulator transition (MIT) regime and/or near the metal semiconductor transition (MST) regime. Another object of the present invention is to fabricate a microbolometer that attains the maximum temperature coefficient of resistance (TCR) near the metal insulator transition (MIT) regime. Yet, another object of the invention is to present the design of suspended beam sensors made of granular metallic or semimetallic thin film in the discontinuous phase. These sensors are used either as bolometers or as displacement sensors.

Figure 1A:
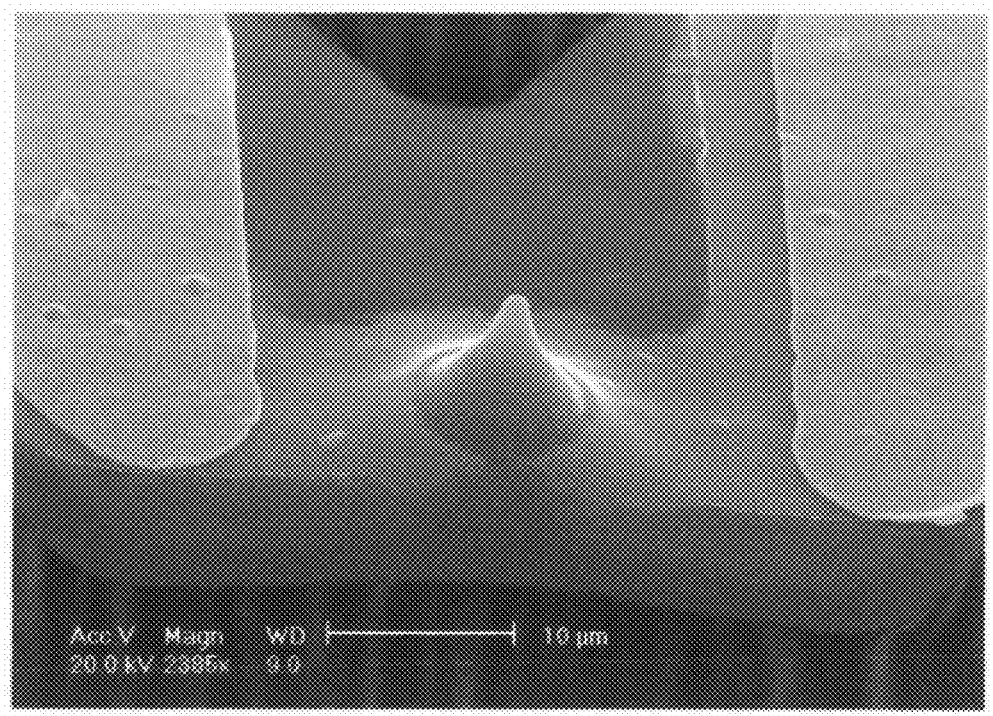
FIG. 1 a shows a scanning electron micrograph (SEM) of a microbolometer probe.
Figure 1A:
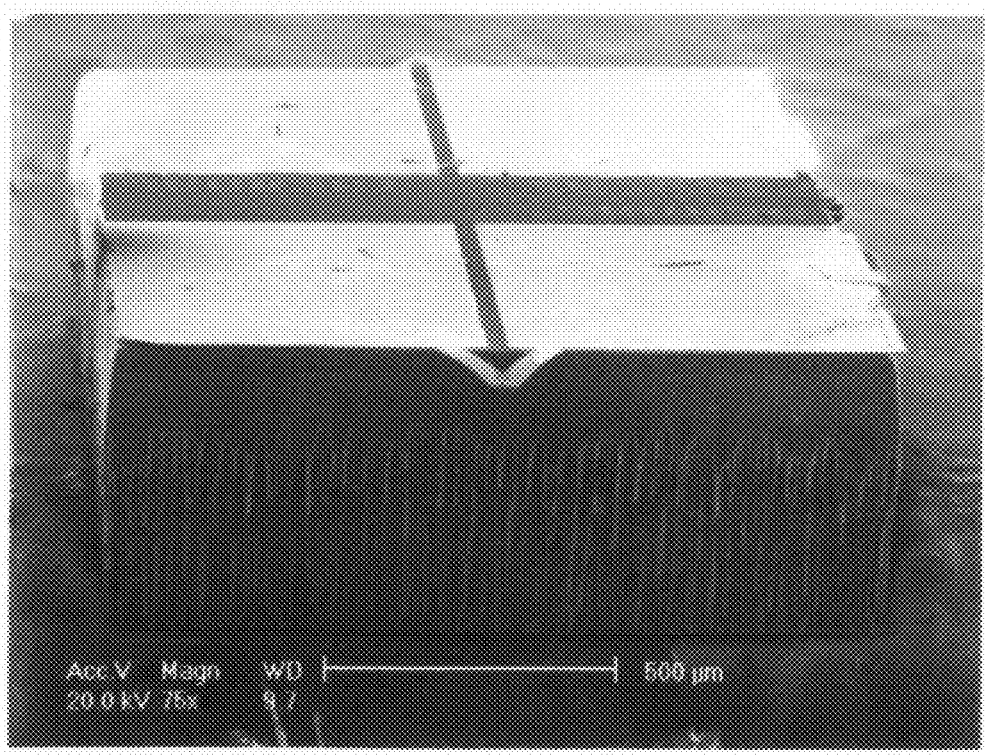
Figure 1B:
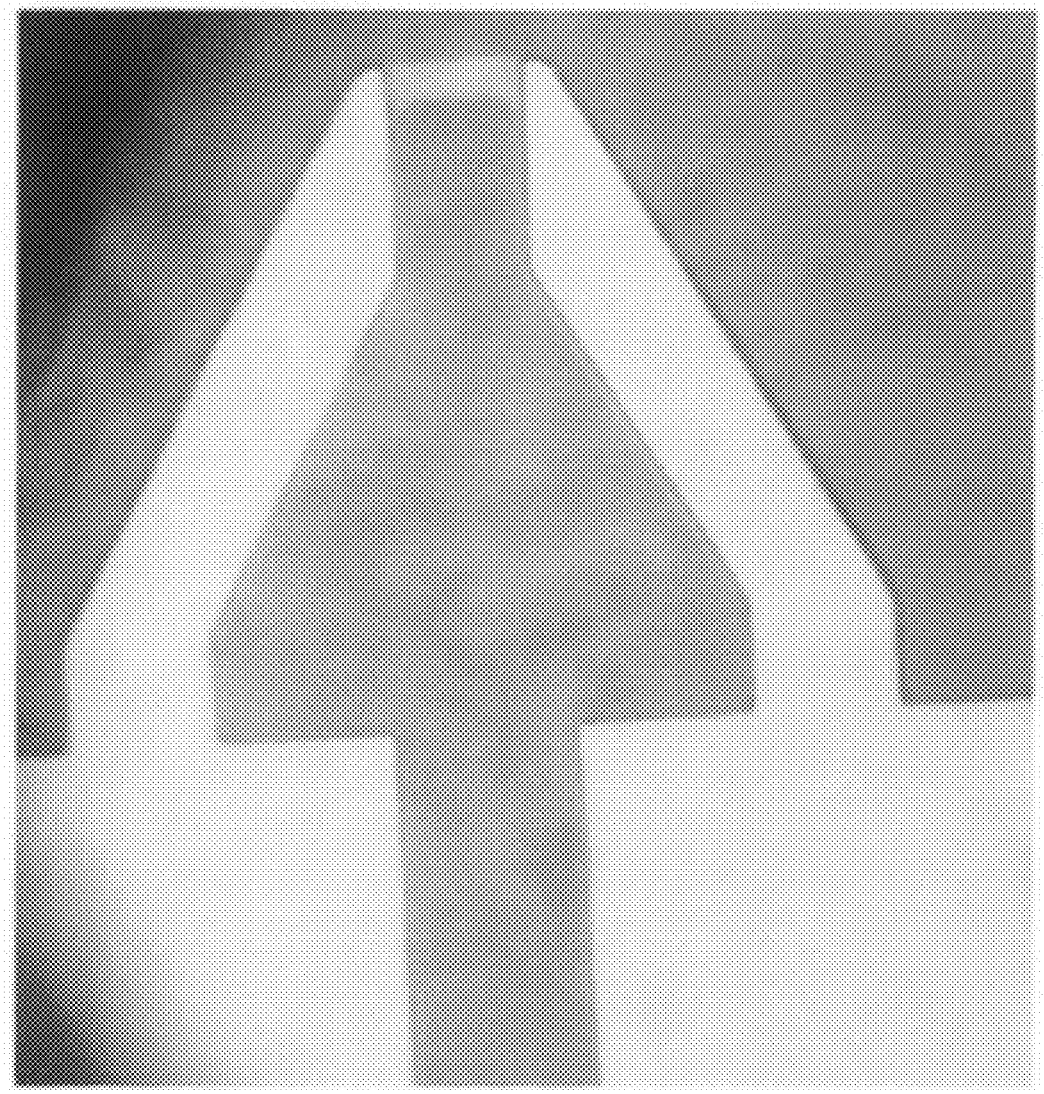

Referring now to the drawings, more particularly to FIG. 1 a, which shows a scanning electron micrograph (SEM) of a microbolometer probe. In this embodiment of the present invention, the cantilevers were made from a 1.1 µm thick SiO2/Si3N4/SiO2 (ONO) layer with 10 µm long Si/SiO2 tips.

A sensing metal film was deposited covering the tip area to form the microbolometer, while a gold layer was deposited on top of the metal film, excluding the tip area which intentionally has only the sensing metal film and not the gold layer. 3 mm×1.4 mm×0.5 mm chips hold the cantilevers.

FIG. 1 b illustrates titanium resistors on a wafer. A, 10 μm wide titanium film was deposited on the substrate to form a resistor. The lengths of the titanium resistors vary from 14 μm to 32 μm. 150 nm thick gold film was deposited on top of the titanium traces excluding the tip area creating leads and leaving exposed a narrow rectangular titanium thin film at the tip area.

Figure 2:
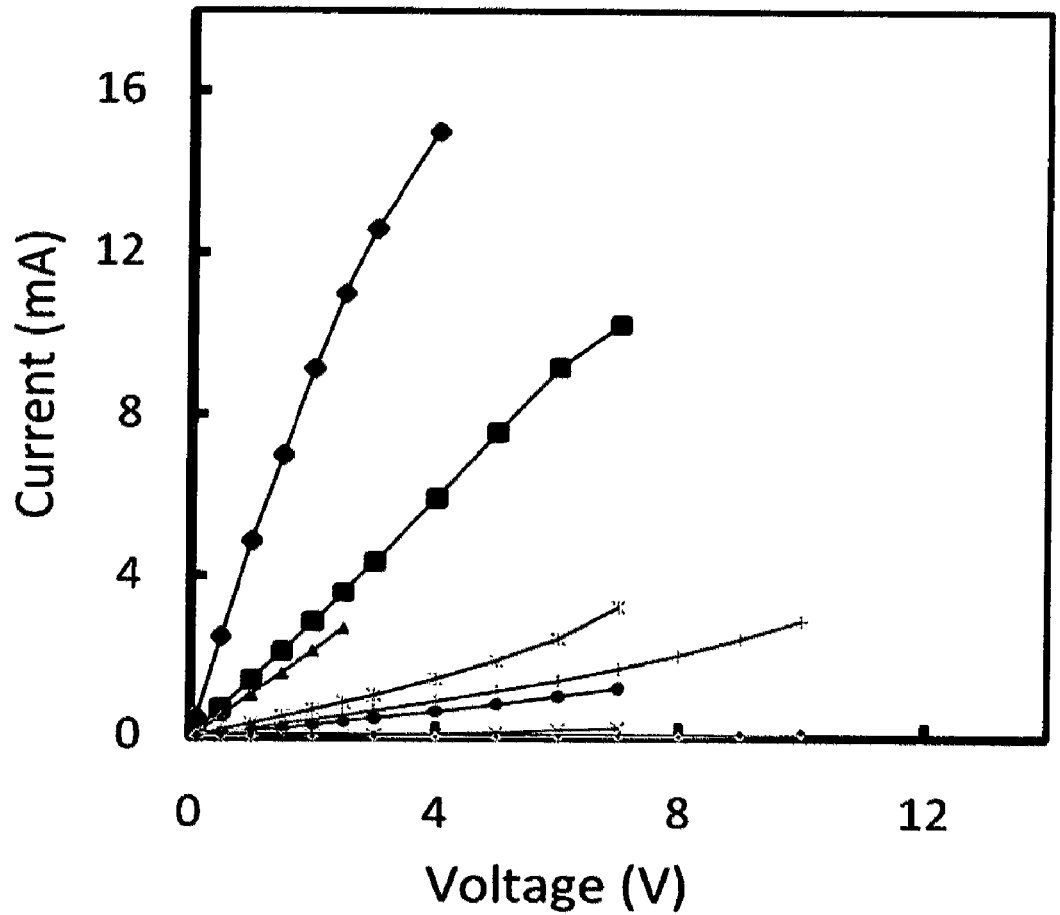
FIG. 2 is a graph depicting the I-V measurements performed on a probe station.

FIG. 2 is a graph depicting the I-V measurements performed on a probe station. The, I-V characteristics of resistors on SiO2/Si wafers with two terminal Ohmic resistances between 200Ω to 6.37 kΩ are illustrated in this graph. The, I-V curves exhibit a sub-linear behavior at two-terminal Ohmic resistance values below 1 kΩ. As the two-terminal Ohmic resistances increase above 1 kΩ, the I-V curves exhibit superlinear characteristics. At values close to 1 kΩ/□, the I-V curves begin to approximate a linear behavior.

Figure 3:
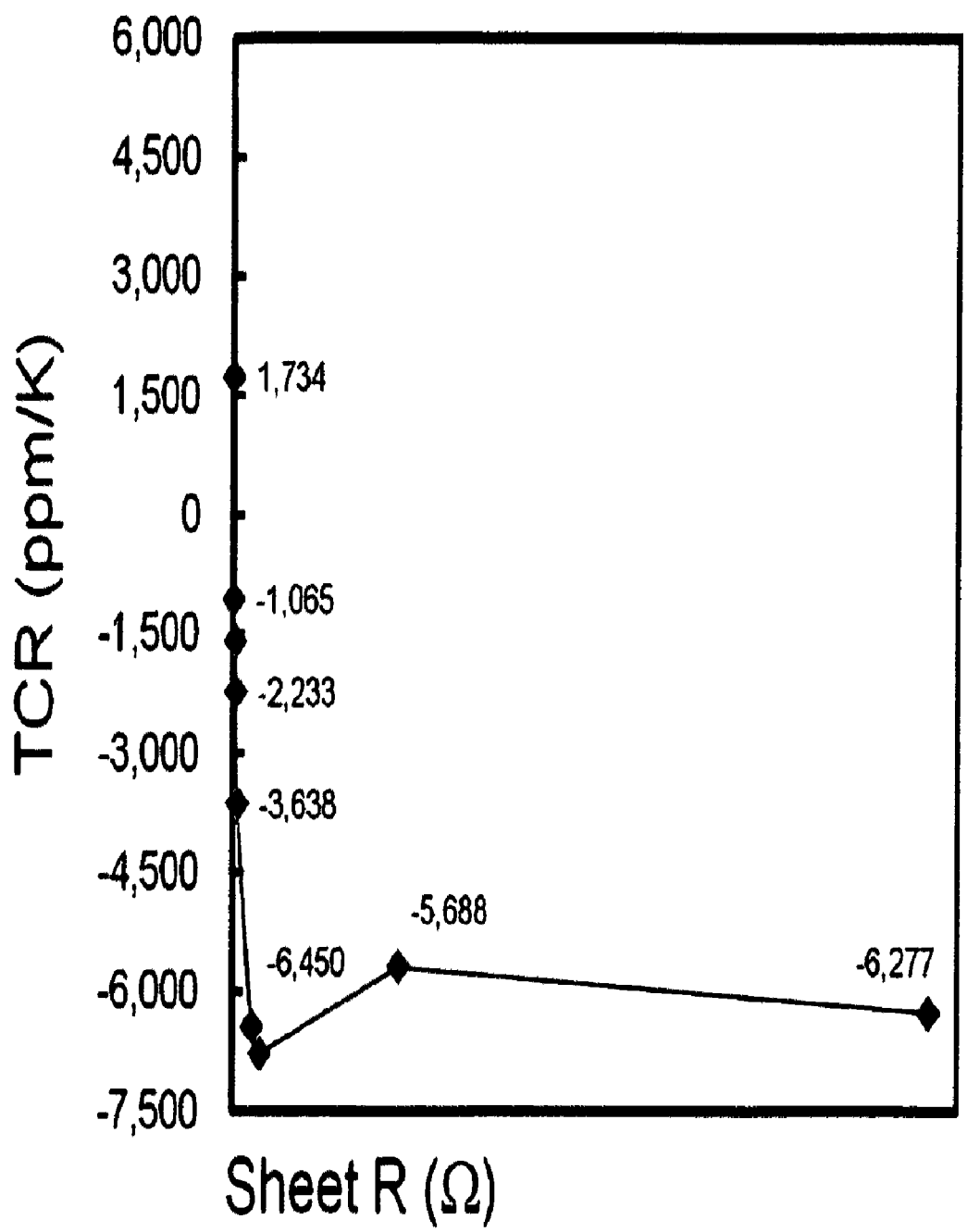
FIG. 3 is a graphic plot of the temperature coefficient of resistance (TCR) as a function of sheet resistance.

FIG. 3 is a graphic plot of the temperature coefficient of resistance (TCR) as a function of sheet resistance. The TCR was measured using a calibrated micro-heater plate with an atomic force microscope (AFM). The bolometer probe tips were brought in contact with the micro-heater plate. Temperatures were varied from 20±0.1° C. to 101±0.1° C. Sheet resistance values were calculated using the two-terminal Ohmic resistances from the equation $R\square=W R_{2t}/L$, where $R\square$ is the sheet resistance, $R_{2t}$ is the two-terminal Ohmic resistances, W is the width, and L is the length of the device. TCR measurements of the resistors on a substrate were also performed using a micro-heater plate under a probe station. FIG. 3 shows the results of a number of bolometer probes with sheet resistances between 7.3 kΩ/□ and 1920 k/Ω□ that were tested and the results of the number of resistors on a wafer with sheet resistances between 0.29 kΩ/□ and 6.4 kΩ.

$R\square(T)/R\square(300K.)$ correspond to resistors on a wafer with sheet resistances of 0.29 kΩ/□, 1.57 kΩ/□, and 6.4 kΩ/□, and microbolometers with sheet resistances of 11.6 kΩ/□ and 74.9 kΩ/□. It can be observed that as the resistance increases, the slope of the sheet resistance vs. temperature changes from positive to negative. With increasing sheet resistance, the TCR values first shift from positive to negative and then continue to decrease until they plateau (after a specific resistance value). There is an optimal sheet resistance beyond which there is no improvement in bolometric sensitivity. For the titanium films studied, this value was measured to be at approximately 74.9 kΩ/□ with a minimum TCR value of around −6790 ppm/K.

Another sheet resistance value of interest is near 1 kΩ/□ where the TCR is close to zero. This is useful for applications that require resistors that are not influenced by temperature fluctuations. These two results may be combined in order to develop microbolometers where the sensing area would be of a thickness that would provide the highest TCR in absolute values, while the electrodes would be of a thickness near zero TCR. Similar to the crossover from sublinear to superlinear I-V characteristics, the transition from positive to negative TCR also occurs at around 1 kΩ/□.

Figure 4:
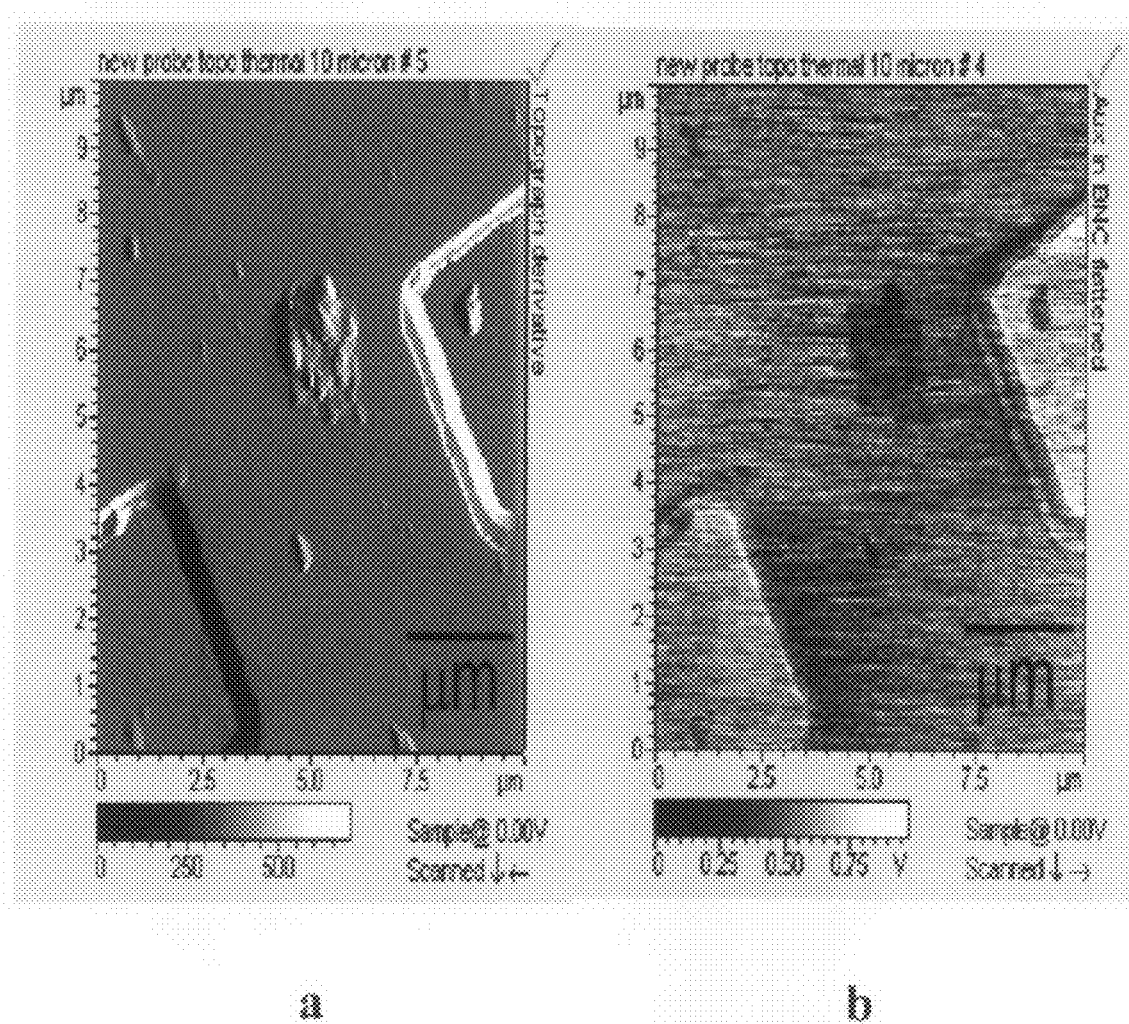
FIG. 4 illustrates topographical (a) and thermal (b) scans of images obtained simultaneously when a patterned sample is scanned by the bolometer probe.

FIG. 4 illustrates topographical, a and thermal, b scans of images obtained simultaneously when a patterned sample is scanned by the bolometer probe. The sample is a silicon calibration grating with 10 μm long and 200 nm deep pitches. The probe resistance change is related to the output voltage change which is proportional to the supplied power change. The supplied power change is equal to the conductive heat loss between the tip and sample which is proportional to the change in the thermal conductance of the sample. Therefore, the plot of the circuit output voltage represents the thermal conductance changes of the sample. These scans were performed with a 7.2 kΩ/□ thin film titanium probe with a measured TCR of −3638 ppm/K. Submicron features are visible. The noise equivalent temperature difference (NETD), which is also dependent on the circuitry, is calculated from [23] to be approximately 18 mK. These microbolometers have operating temperatures of up to 115±0.1° C. Significant improvements in the NETD can be made by using more advanced circuitry [24]. The probe design can be improved by further confining the bolometer thin film to the tip area. The TCR can be further improved by using alternative materials at the metal-insulator transition regime that may provide a higher TCR.

Figure 5A:
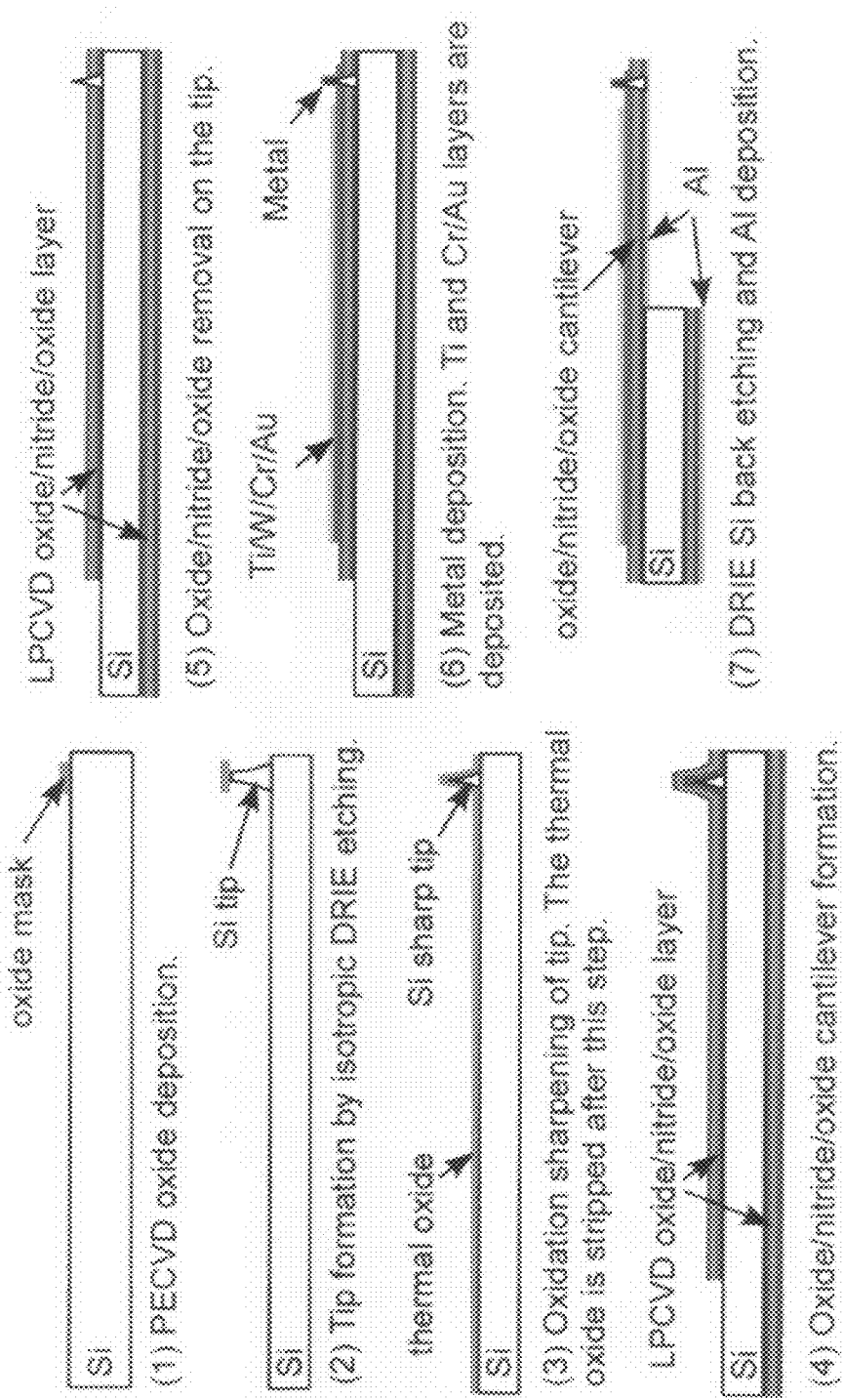
FIG. 5 (a-e) are flow charts of the various fabrication process steps.
Figure 5B:
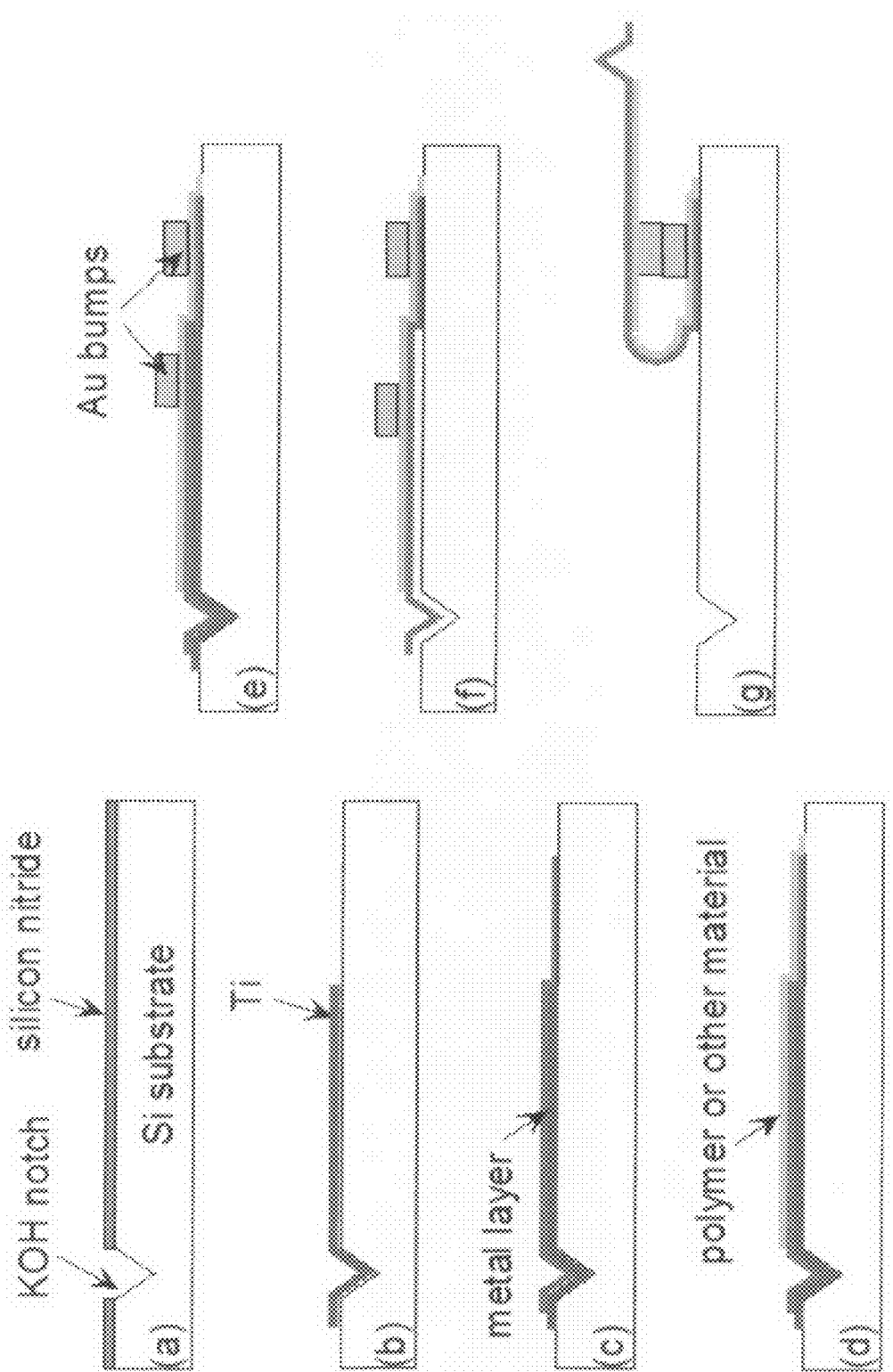
Figure 5:
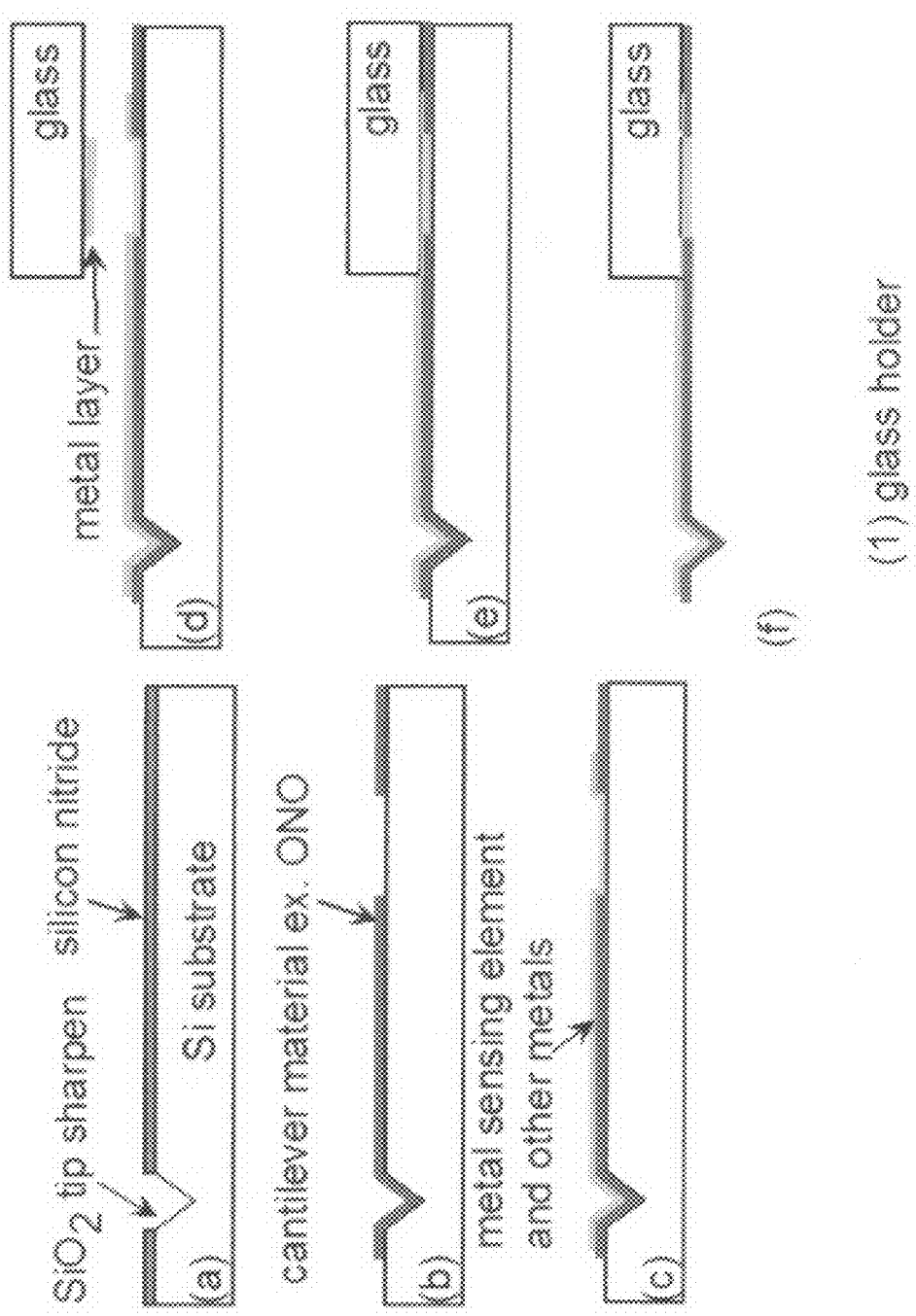
Figure 5:
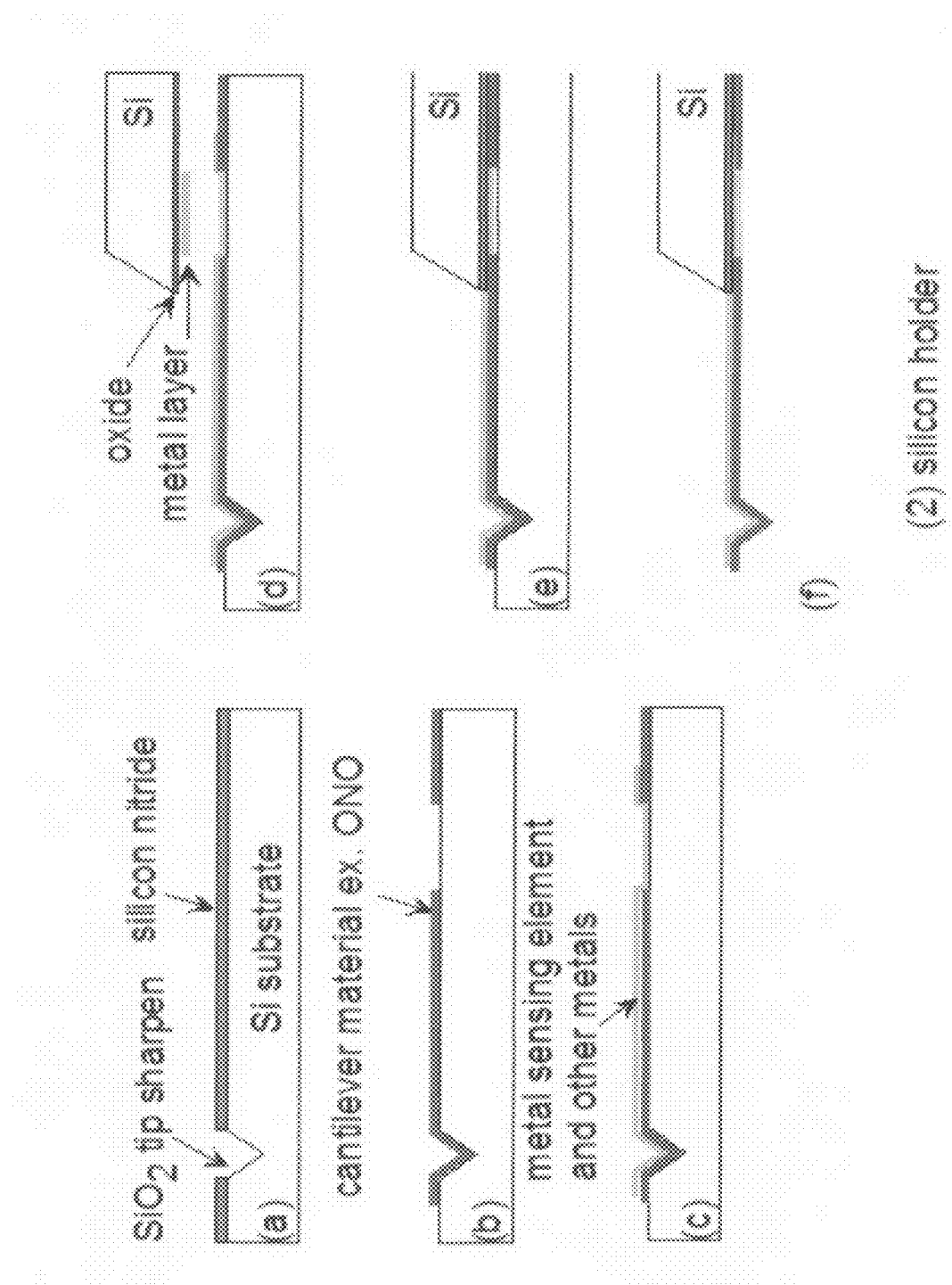
Figure 5E:
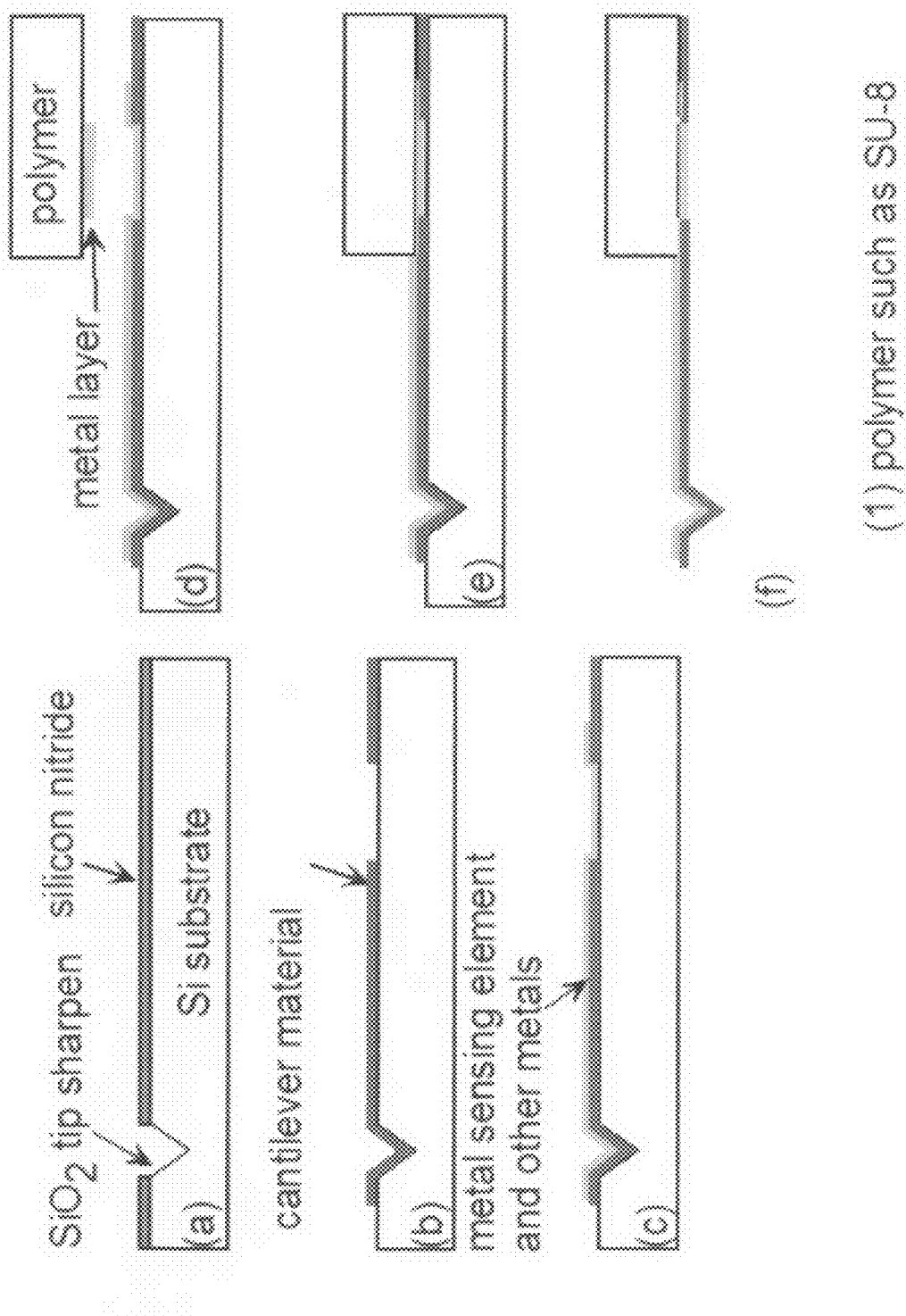

FIG. 5 describes the method used to fabricate the microbolometer probe designs. The fabrication process included, tip formation by isotropic DRIE dry etching with an oxide layer as etch mask; tip sharpening by growing 1 μm thermal oxide followed by a BHF oxide removal step; 1.1 μm thick LPCVD ONO layer deposition on the Si substrate; cantilever patterning by a sequence of ONO etching steps; tip area SiO2/Si3N4 layer removal; metals patterning with a series of lift-off processes including the sensing element; wafer backside etching for device release; and 20 nm of aluminum backside deposition. Some designs are rectangular with 100 μm×100 μm and 100×220 μm areas and some designs are triangular with 100 μm and 220 μm wide bases and 64 μm and 160 μm in length respectively. In addition, three different wafers were prepared with titanium resistors having thicknesses between 10-20 nm, deposited on SiO2.

FIG. 5 a, is a flow chart of the fabrication process steps. First, the tip is formed on a silicon wafer by patterning oxide and dry etching (1,2). The tip formation step is optional. The tip is sharpened by oxide sharpening which includes growing 1 micron oxide (3). Then the cantilever is formed by LPCVD Oxide/silicon-nitride/Oxide (ONO) layer 5000 A/2000 A/4000 A, patterning (4), and removing the ONO layer from the tip (5). The ONO layer removal is optional. Instead of Oxide/silicon-nitride/Oxide any other material can be used, including, polymers such as parylene, polyimide, Si3N4, silicon oxide, and piezoelectric materials including, olyvinylidene fluoride material or a lead zirconate titanate. The metals are then patterned. Three metal layers are deposited although one layer is sufficient (6). The backside is etched using STS (7).

Optionally, a layer may be deposited on top of the metal to insulate the material or for other purposes such as to provide protection. That sandwich layer may be of any of the materials mentioned above including polymers, elastomers, silicon nitride, etc. Any other prior art process can be used. The cantilever can be a suspended beam with one or two anchors. The beam can be made of any of the following materials: SU8, polymers, silicon nitride, oxide, silicon oxide, silicon or a combination thereof. In order to increase the thermal isolation of the sensor, the beam needs to be very thin. The metal or semimetal used for a sensing element can be any metal with thickness near the metal insulator transition (MIT) region. The sensing area may remain exposed while the rest of the area may be made of any other conducting material. This process may be used to fabricate a cantilever or a suspended beam with two anchors. In order to increase sensitivity at the sensing area, following the granular thin film deposition, a second metal layer may be deposited with openings in the sensing area(s) making these areas more susceptible to temperature changes or bending or other types of changes.

FIG. 5 *b* shows an alternative fabrication process which involves a cantilever flip-over. The steps involved are, (a) Form a notch with KOH; (b) Ti deposition and pattern; (c) Metal deposition and pattern; (d) Polymer material deposition and pattern; (e) Au bumps deposition and pattern; (f) Release W/Au cantilever by etching away Ti sacrificial layer; (g) Flip W/Au cantilever and bond the gold bump. The tip formation of step (a) is optional.

FIG. 5 *c* illustrates another fabrication sequence. First, a mold is created for the tip by anistropic wet etching on a Si substrate (a). Optionally a sacrificial layer is deposited and patterned, followed by the lower cantilever material which extends to the chip and includes an opening for the pads (b). The cantilevers can be made of oxide/nitride/oxide, Si3N4, polymers, or piezoelectric materials such as polymer piezoelectrics or ceramic piezoelectrics. The metals are then deposited and patterned forming the sensor (c). Other metals may also be deposited at selected areas such as the pads. Later, the second cantilever layer may be optionally deposited and patterned, followed by a gold layer, which will be used for thermo-compression bonding and will also serve as a mirror. A second wafer of etched glass with metal is bonded to the first wafer (d) and (e). The bottom wafer is then released (if a sacrificial layer is used) or dissolved (f).

FIG. 5 *d* illustrates another fabrication sequence. Steps (a) through (c) are similar to FIG. 5 *c*. A second wafer of etched silicon with metal is bonded to the first wafer (d) and (e). The bottom wafer is then released (if a sacrificial layer is used) or dissolved (f).

Finally, FIG. 5 *e* illustrates another fabrication sequence. Steps (a) through (c) are similar to FIG. 5 *c* and FIG. 5 *d*. This time the second wafer contains a polymer which is patterned in order to form the carrier chip for the cantilever (d) and then bonded to the first wafer (e), then both wafers are etched or released (f). Alternatively, a polymer handle may also be patterned and deposited directly (e). The bottom wafer is then released (if a sacrificial layer is used) or dissolved (f).

In all these processes, optionally, the top and bottom cantilever material can form a sandwich with the sensing element in the middle by depositing cantilever material on both sides. Forming a tip is also optional. Finally, oxide sharpening of the tip is optional.

Figure 6:
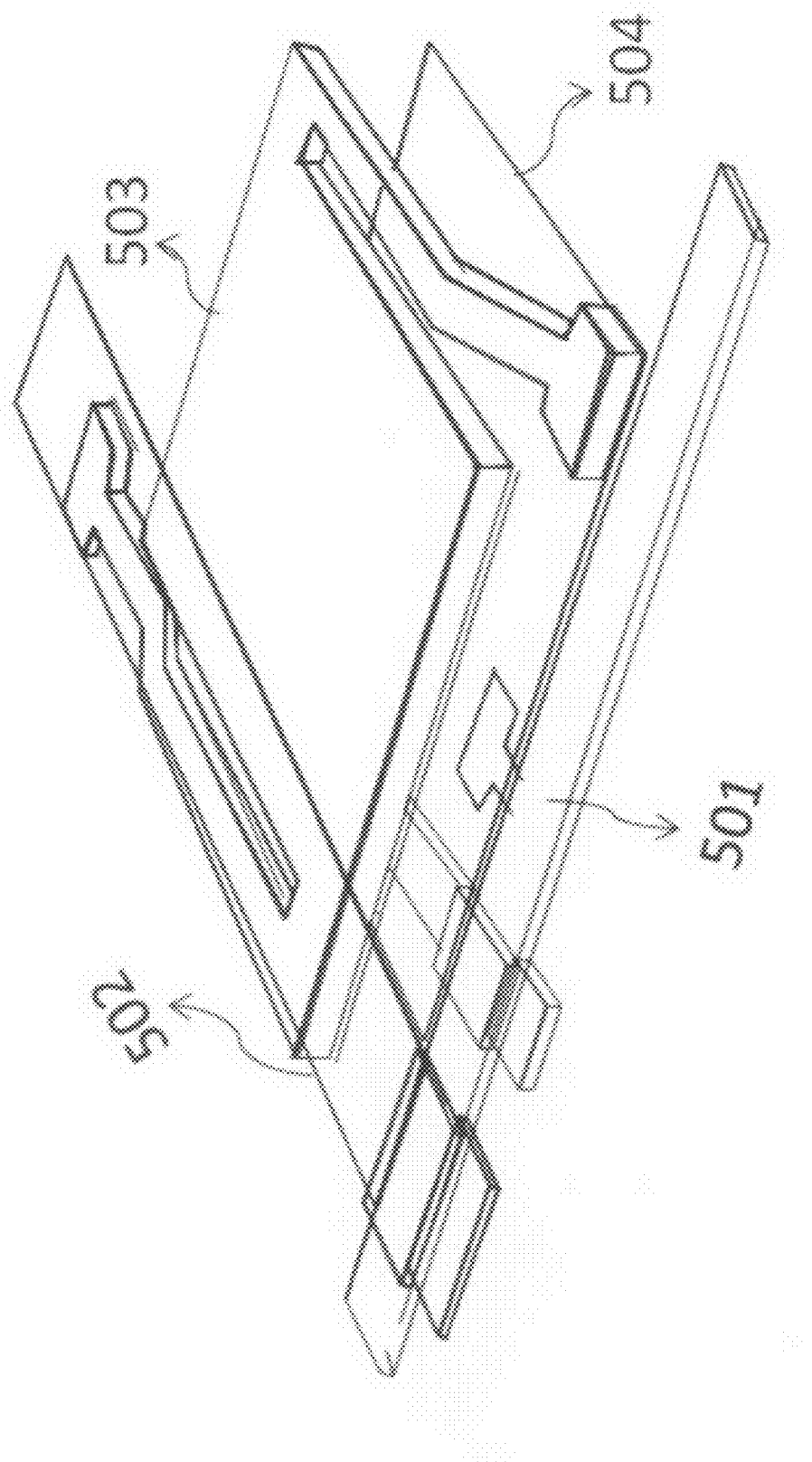
FIG. 6 shows a typical bolometer design with the proposed thin film sensor.

FIG. 6 shows a typical bolometer design with the proposed thin film sensor. The bolometer, 503 is made of a thin film of metal or semimetal at the metal insulator transition (MIT) or metal semiconductor transition (MST) thickness where the temperature coefficient of resistance (TCR) is maximized to Complementary Metal-Oxide-Semiconductor (CMOS) technology 504.

Figure 7A:
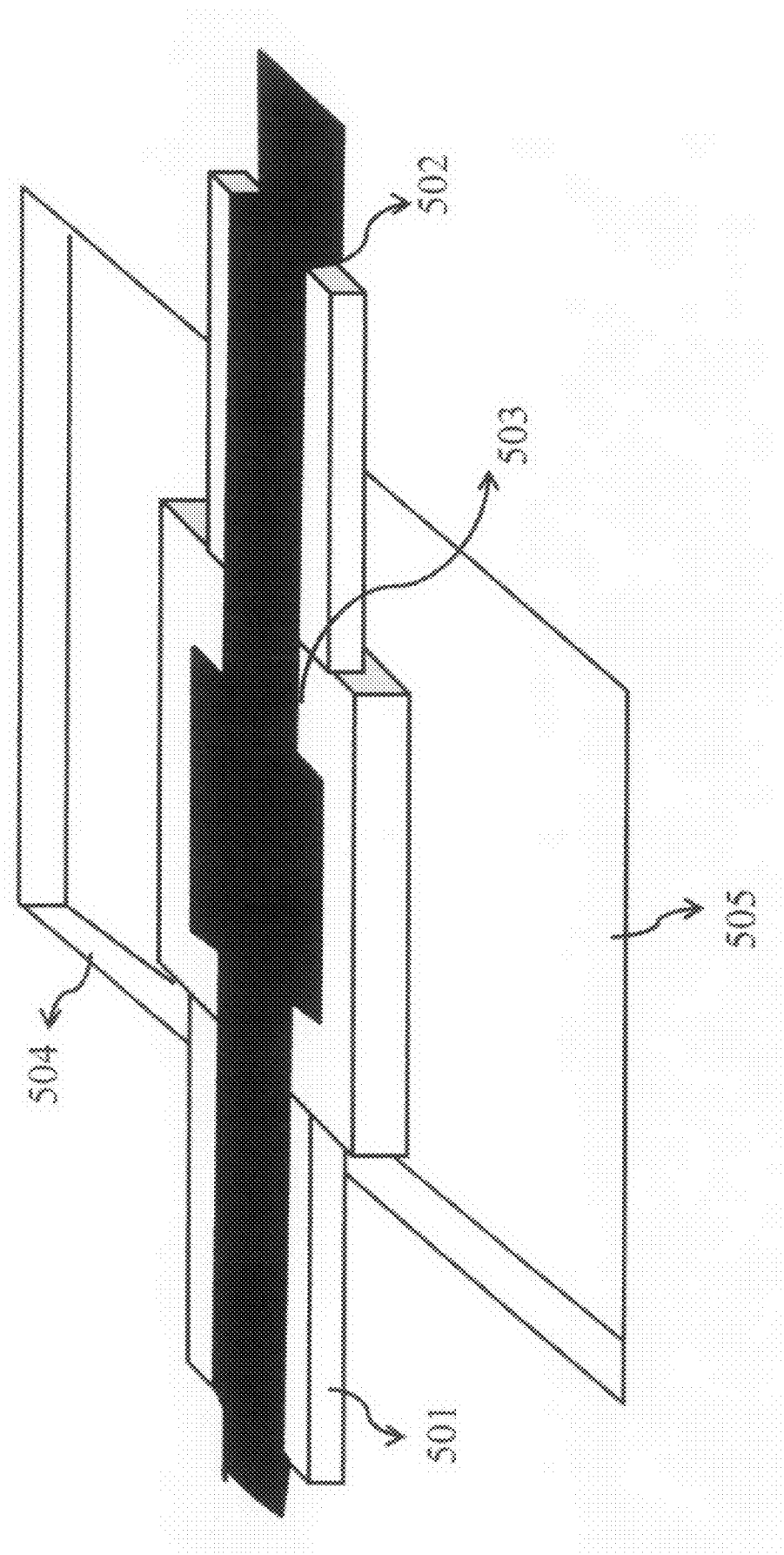
FIG. 7 a, illustrates a top planar view of a doubly clamped beam (two anchored beam) structure with the sensing element.

FIG. 7*a* illustrates a top planar view of a doubly clamped beam (two anchored beam) structure with the sensing element, 503, and metal conductors, 501 and 502, compatible with the current CMOS 504 and 505 processes. This device can be used as a bolometer, mass measurement sensor, or chemical sensor etc. This resistive sensor can be used as a thermal conductivity detector (TCD) in gas-liquid chromatography. Since these thin films exhibit small particle size and extremely large specific surface area, the sensors may be used for humidity, gas-sensing, and detection of particles in the air including explosives. Films of nano-sized metal and metal-oxides can be synthesized by a number of techniques such as laser ablation, sputtering, evaporation, spray pyrolysis, Sol-Gel, screen printing. These devises may also be thermally actuated with an AC excitation. If vibrated electrically at the resonance frequency any change in mass will change the frequency which can be measured-electrically.

Figure 7B:
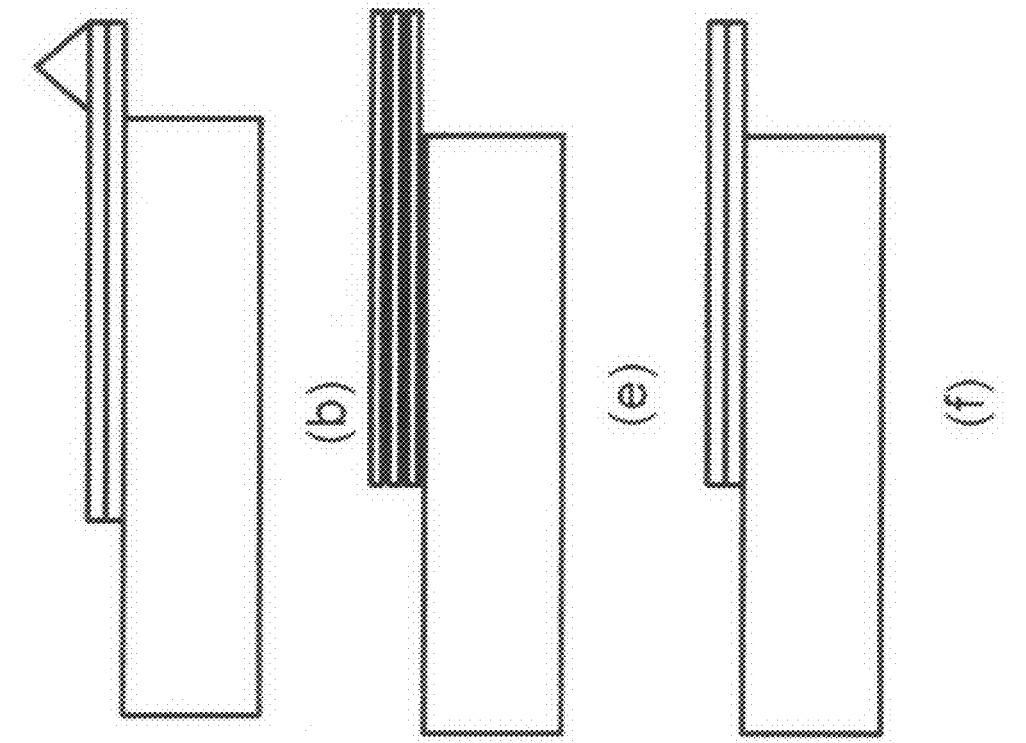
Figure 7B:
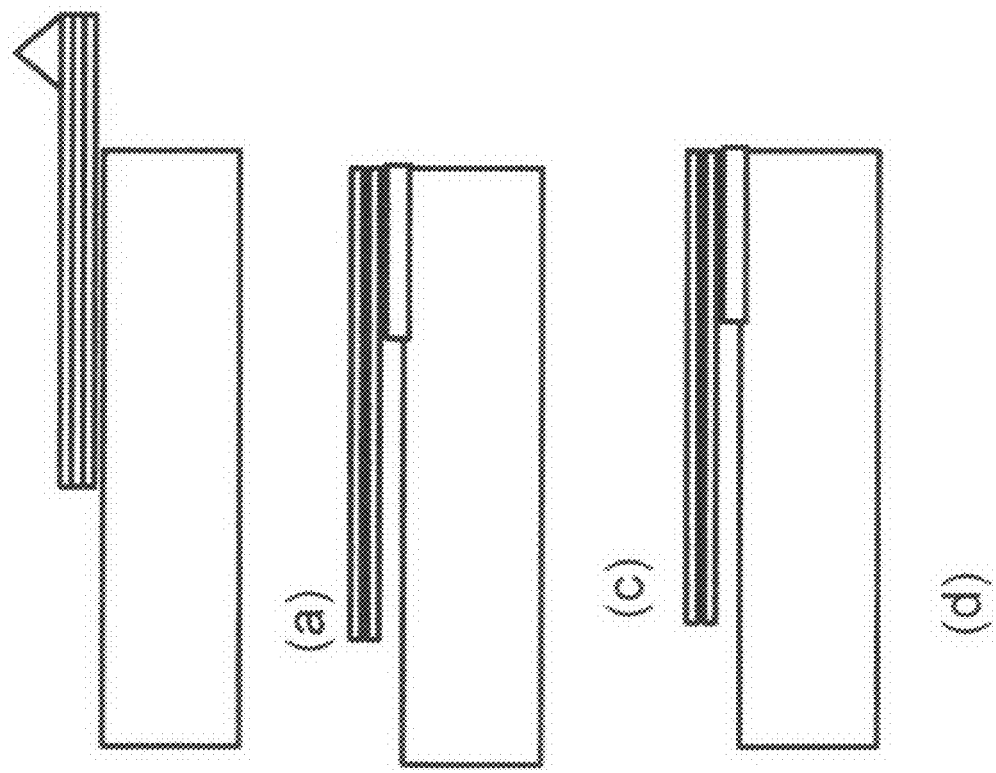

FIG. 7*b* illustrates six different designs: (a) shows a thin metal film sandwiched between two insulating layers and includes a probe tip for Atomic Force Microscope (AFM) or Scanning Probe Microscope (SPM) scanning; (b) shows a cantilever with one layer of insulating material and a thin metal film on top of it; (c) shows a suspended beam with a metal layer on top for sensing. In, (d) the same beam includes an insulating layer on top of the sensing layer. In (e) and (f) the same designs extend outwards.

Figure 8:
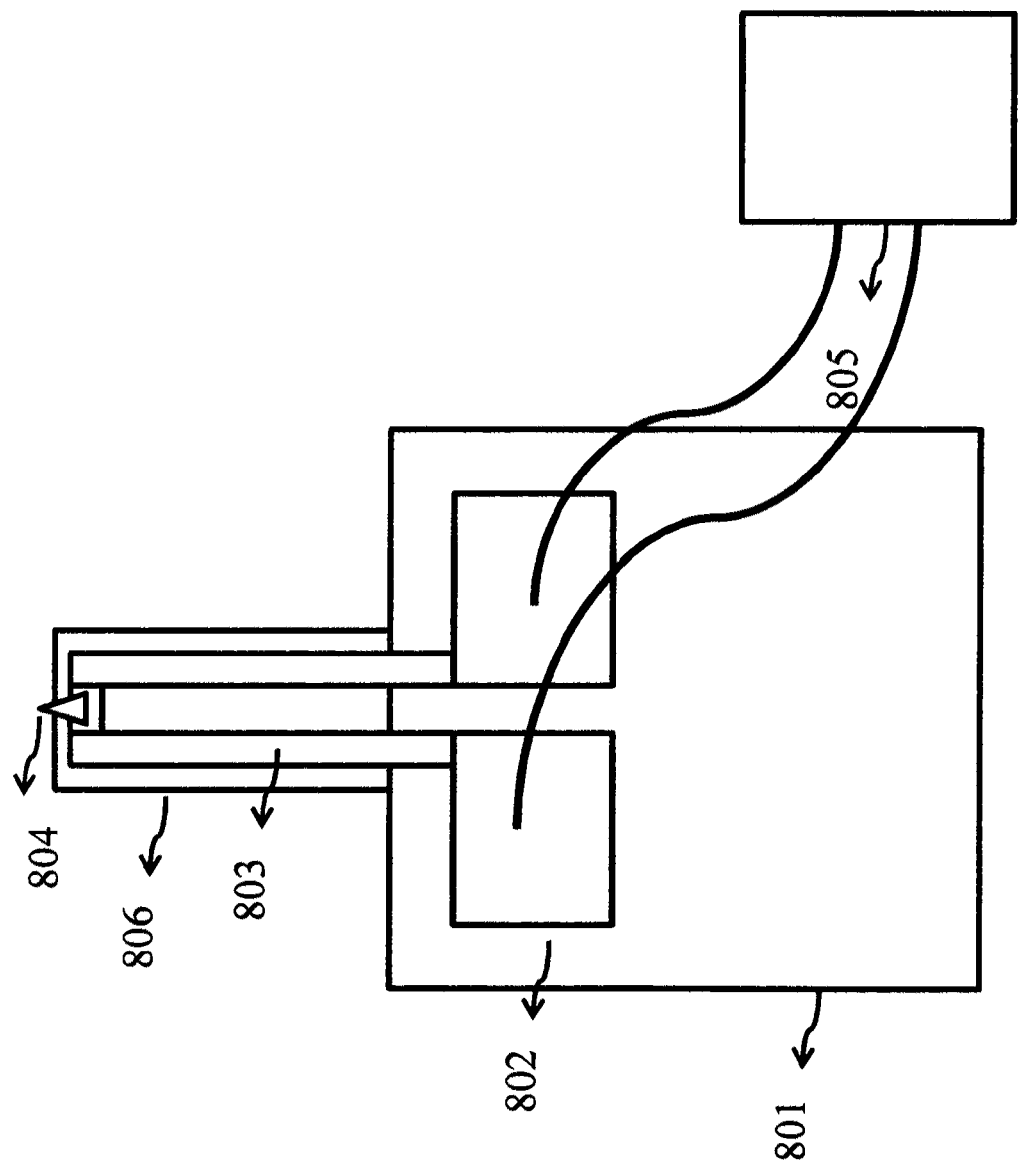
FIGS. 8 a, and 8 b illustrate a bolometer thermal probe.
Figure 8:
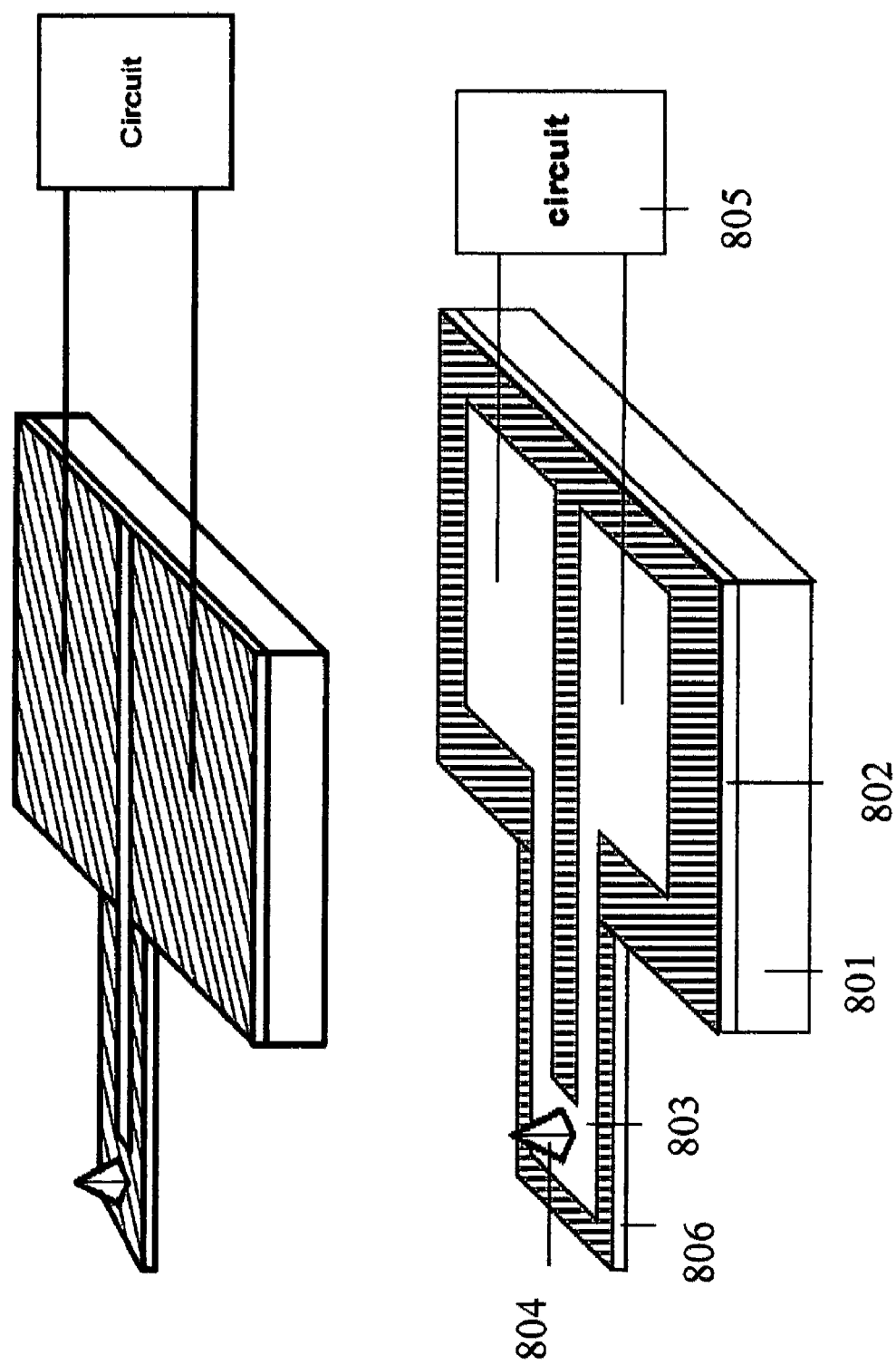

FIGS. 8 *a* and 8 *b* illustrate a bolometer thermal probe with a cantilever, 806 with a tip 804 and electrical traces 803 connected at the tip on one side and separated into two pads 802 on the side of the chip 801. An interface circuit 805 is connected to the two pads. There are a number of circuits that can be used. For example a Wheatstone bridge circuit may be used where one of the resistors is the probe. One of the three remaining resistors can be another probe not in contact with the sample but used to reduce noise. Typically, the bridge signal is connected to an amplifier or amplifiers and a low pass filter. The bridge is biased with DC voltage. The bridge can also be biased with an AC voltage, for instance, a lock-in amplifier may be used.

These devices can also be used for the thermal tapping mode of Atomic Force Microscopes (AFM) scanning or in mass measurements, for instance, in chemical detection or biological applications. The cantilevers oscillate by the thermal bimorph effect of the metal cantilever. The device employs a resistive heater. This can be used with an AFM or without an AFM. A function generator and a lock-in amplifier can be used. A function generator is used to apply sinusoidal alternating current ac to the probe's thin film resistor. Ac driven intermittent heating and cooling causes the cantilever to vibrate due to the bimorph effect. An AFM laser aligned on the cantilever is reflected into the photodetector and can be used to measure the amplitude changes. The sample is scanned without the optomechanical feedback. The deflection signal provides topographical information, while the amplitude of the oscillation is related to the damping of the tip-sample interaction, and provides parametric information.

Figure 9:
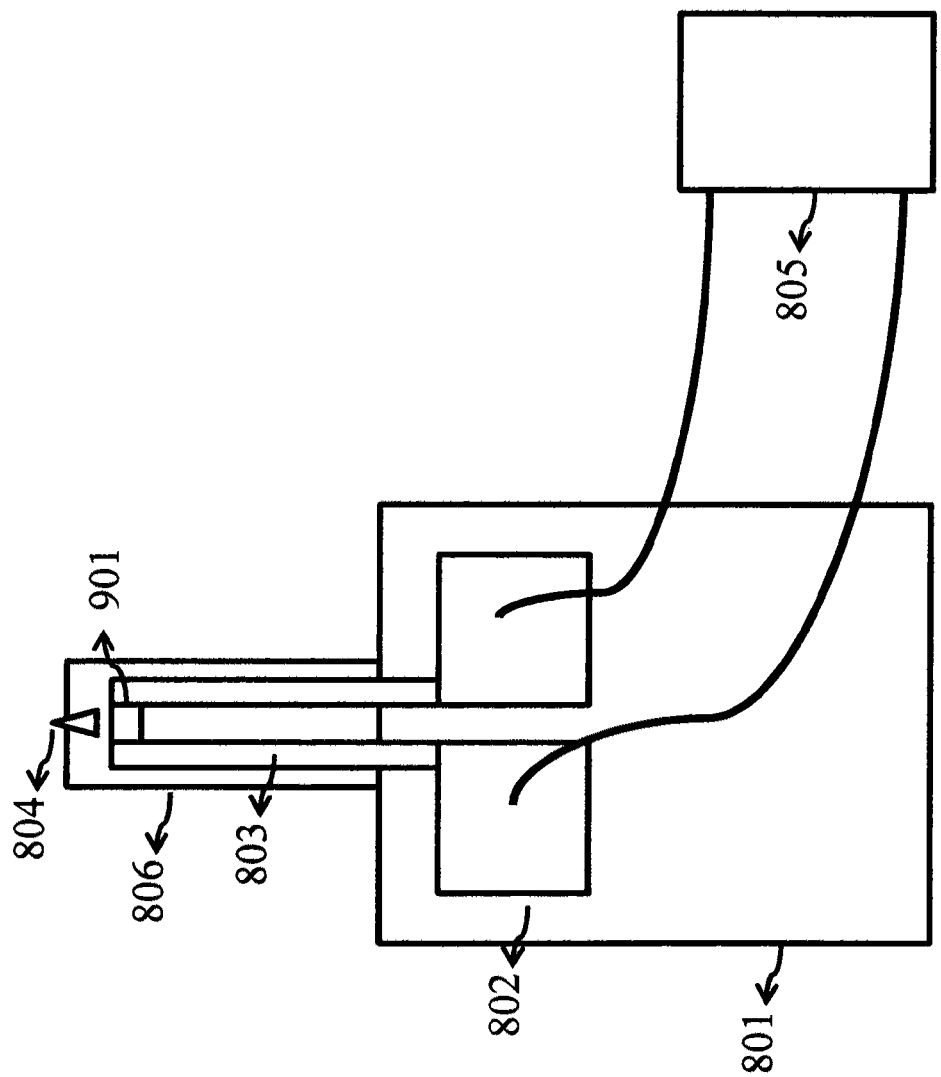
FIG. 9 illustrates a bolometer thermal probe with the traces connected just below the tip.

FIG. 9 illustrates a bolometer thermal probe with a cantilever 806 with a tip 804 and electrical traces 803 connected below the tip on one side and separated into two pads 802 on the side of the chip 801. The key difference here is that the traces connect just below the tip 901. An interface circuit 805 is connected to the two pads. As the tip scans the sample, infrared radiation is detected by the metal strip 901 that connects the 2 traces. This strip 901 is usually thinner, to increase the sensitivity. A second layer of metal, like gold, is deposited on the traces 803 but not on that thin strip 901. Note that the device of FIG. 9 may also be used as a deflection detector if 803 and 901 are closer to the base of the cantilever in order to increase sensitivity to bending.

Enhanced Designs

The thermal sensor is designed so that most of the change in resistance occurs at the desired sensing area. This can be achieved by making the rest of the metal line wider and thicker and even depositing a second layer of metal over the metal line excluding the sensing area. Sometimes the above strategies are not enough to reduce the noise from the metal lines. As a result, the signal from the sensing area 804 is not as clear. A reference cantilever has been used as one of the four resistors in a Wheatstone bridge arrangement to overcome this. In this disclosure described in FIG. 10, the reference resistor 1002 is included on the cantilever. In order to extract the signal from the sensor using a Wheatstone bridge, both the reference resistor 1002 and the resistor 1001 that includes the sensing element 804 are part of the bridge arrangement. Any topographical change due to bending of the cantilever, heating of the cantilever, or environmental change is eliminated using this arrangement.

Figure 10:
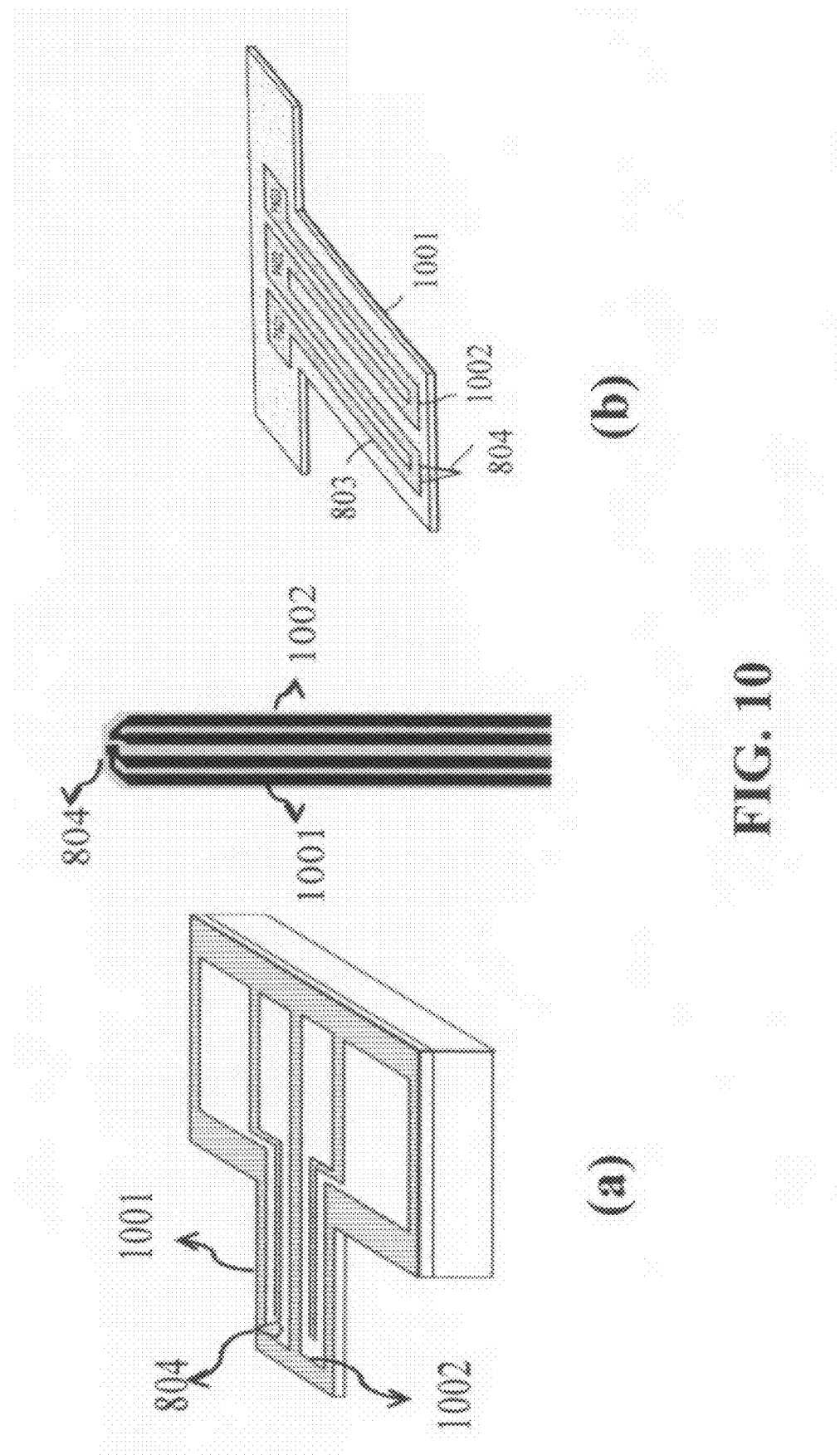
FIG. 10 illustrates the resistor included on the cantilever.
Figure 11:
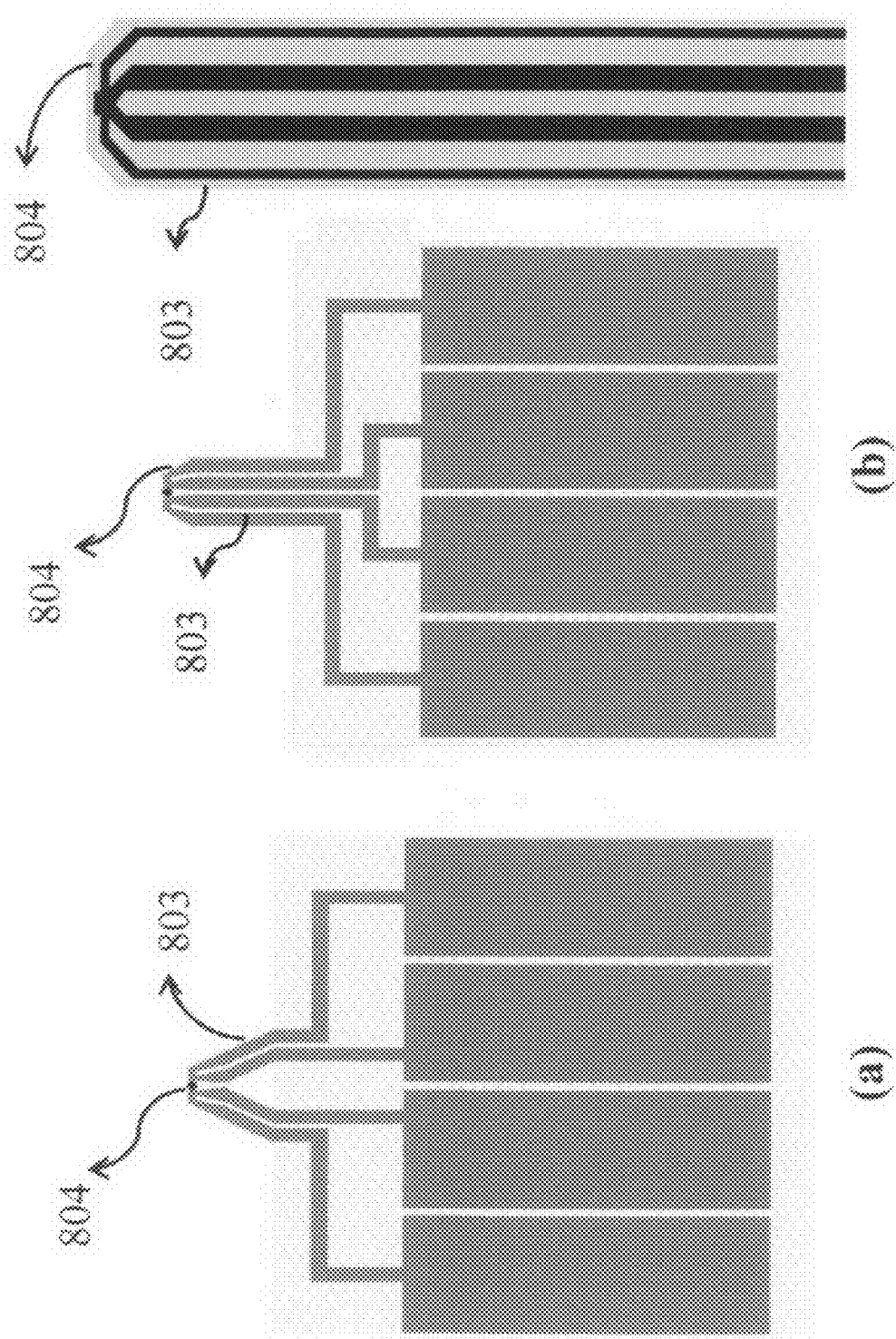
FIG. 11 illustrates an alternative design to reduce environmental noise and influences.

FIG. 11 illustrates an alternative way to reduce environmental noise and influences. This design resembles a four point probe which connects at the sensing area 804. The outer leads 803 are used to pass current while the inner leads 803(*a*) are used to measure voltage. Three designs, (a), (b), and (c) are illustrated. FIG. 10 and FIG. 11 design concepts can be used for any type of bolometer probe including doped silicon bolometers. The designs presented here are used for thermal sensing.

Displacement and Mass Measurement

For a bulk material, piezoresistivity is the coupling between the stress tensor and the electrical resistivity, represented by the equation:

$$\frac{\Delta \rho_{ij}}{\rho_0} = \pi_{ijkl} \sigma_{kl}$$

Here □ is the stress tensor □□ is the change in resistivity tensor. For metals, the piezoresistive effect is mainly due to smaller mean free path from smaller lattice spacing. For semiconductors, there is an additional effect due to change in curvature of the E-k diagram resulting in change in effective electron mass. In certain cases (like □$_{44}$ piezoresistivity) the enhanced piezo-resistive effect is due to change in relative separation of different bands, which facilitate the interband movement of electrons due to change in crystal structure. U.S. Pat. No. 7,249,859 discloses the use of bimaterial piezoresistive cantilevers with metals such as, Au—Si, Pd—Si, Au—Si3N4, and Pd—Si3N4 as an actuating and sensing element. U.S. Pat. Appl. No. 20030089182 also discloses bimaterial piezoresistive cantilevers with metal as an actuating and sensing element. In most cases actuation of the cantilever occurs due to the bimaterial effect—when two materials with different expansion coefficients are used on a cantilever. When one of the materials is heated periodically, it expands and contracts while the second material is not heated, causing the beam to vibrate.

In the present invention, resistivity at the metal-insulator transition for heterogeneously disordered thin films is given by $\rho_c = A(h/e2)d$, where A~1 and d is the average grain size, $\rho_c$ corresponds to R□=10 kOhm/□. Metal-insulator transition (MIT) is observed between the TCR ranges. This behavior can be explained by dividing the TCR range into three distinct regions: a) Near 0, where there is a balance between weak localization effects and Boltzmann behavior, b) low negative TCR values region that can be explained by weak localization, and c) TCR ranges at very high negative TCR values which usually are described by variable range hopping.

Figure 12:
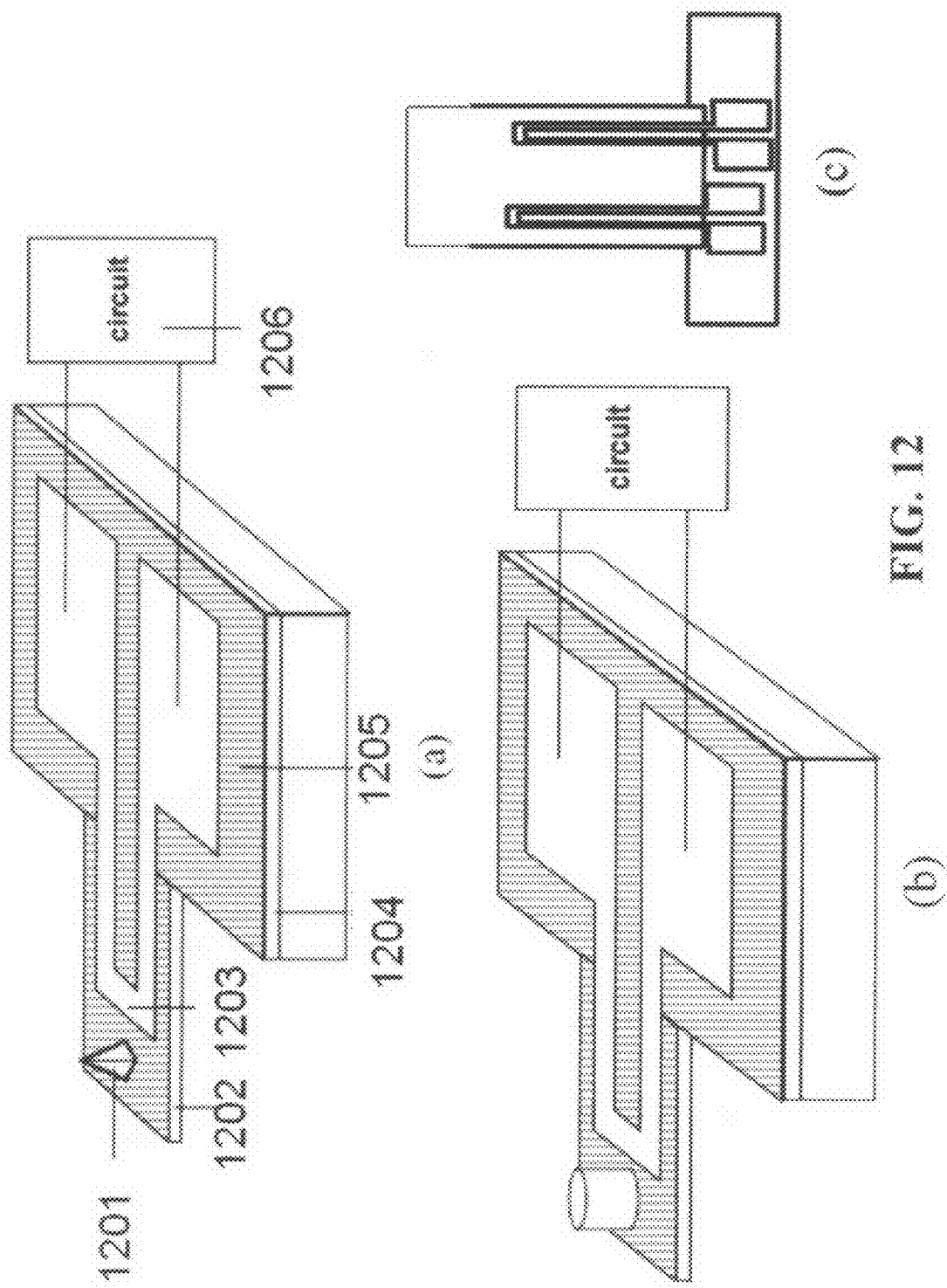
FIG. 12 shows designs that are used for deflection measurement or IR measurements.

FIG. 12 shows designs that are used for deflection measurement or Infrared (IR) measurements. Metal film extends to the area of maximum bending. Typically, this is near the area close to the chip. In the case of very soft cantilever materials this area may encompass the entire cantilever or a large part of it. FIG. 12 (*a*) illustrates a probe design for displacement measurements with a cantilever 1202 with a tip 1201 and electrical traces 1203 below the tip. The tip is optional. The cantilever 1202 may be made of any of the materials commonly used or other materials as described. The cantilever may sandwich the sensor between two materials or may only reside under the sensor. The cantilever rests on a chip 1204 and an insulating substrate 1205. An interface circuit 1206 is connected to the two pads. There are a number of circuits that can be used. For example a Wheatstone bridge circuit may be used where one of the resistors is the probe. One of the three remaining resistors can be another probe not in contact with the sample but used to reduce noise. Typically, the bridge signal is connected to an amplifier or amplifiers and a low pass filter. The bridge is biased with dc voltage. The bridge can also be biased with an AC voltage, for instance, a lock-in amplifier may be used. In addition, similar circuits to the ones used for thermal or bolometer probes may be used. In FIG. 12(*b*) the tip is a tube like shape. It could also be a square shape or any other shape such as a pyramid with a flat tip at the end or a cone shape with a sharp or a flat tip. FIG. 12(*c*) shows a design with two sensors in parallel on each side of the cantilever in order to measure bending but also cantilever rotation or frictional imaging or lateral movement. These designs can be used to measure displacement. In what follows a number of applications are described.

Figure 13:
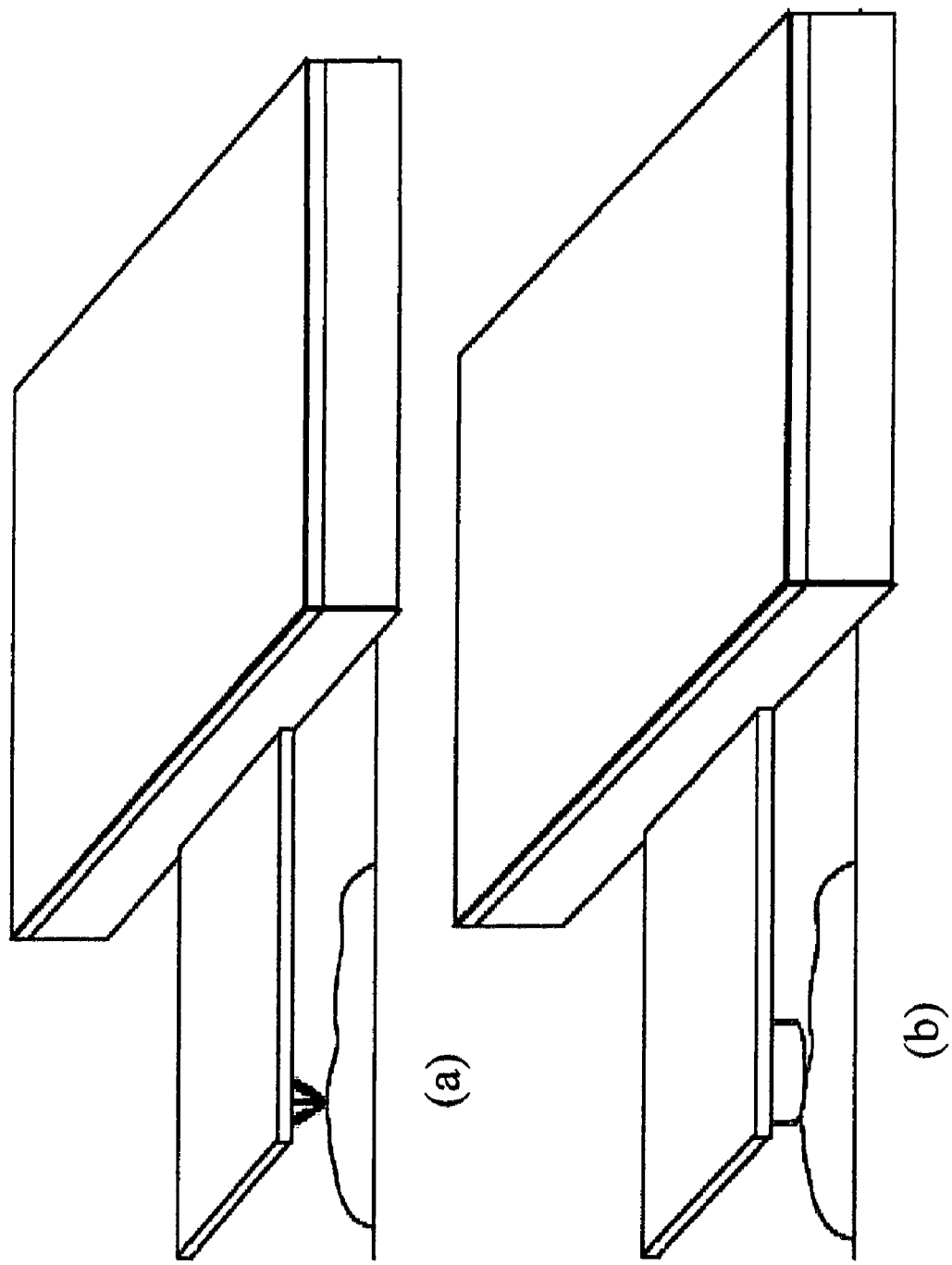
FIG. 13 (a-e) illustrate nano-indentation and visco-elastic probes and measurements.
Figure 13:
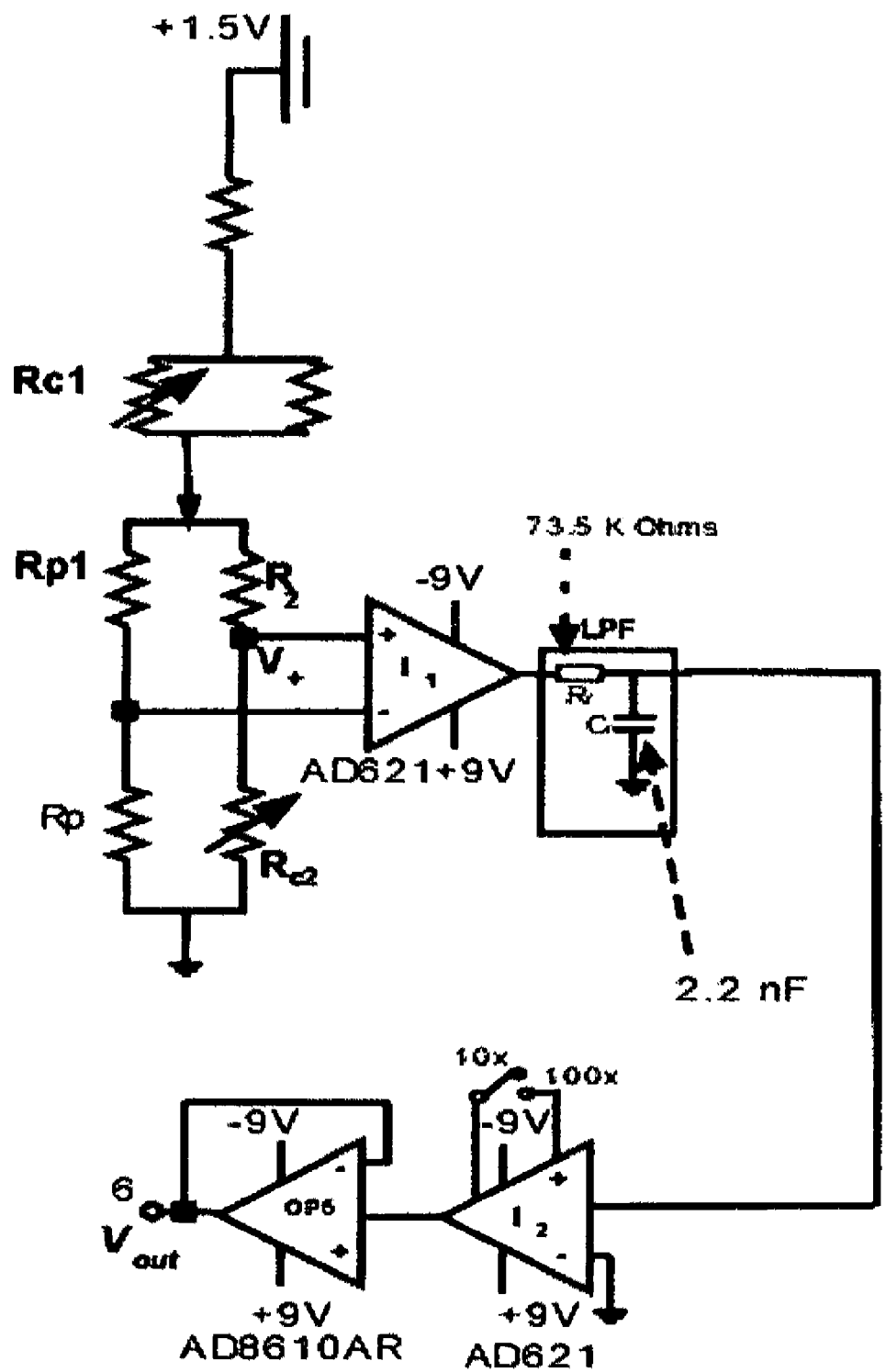
Figure 13:
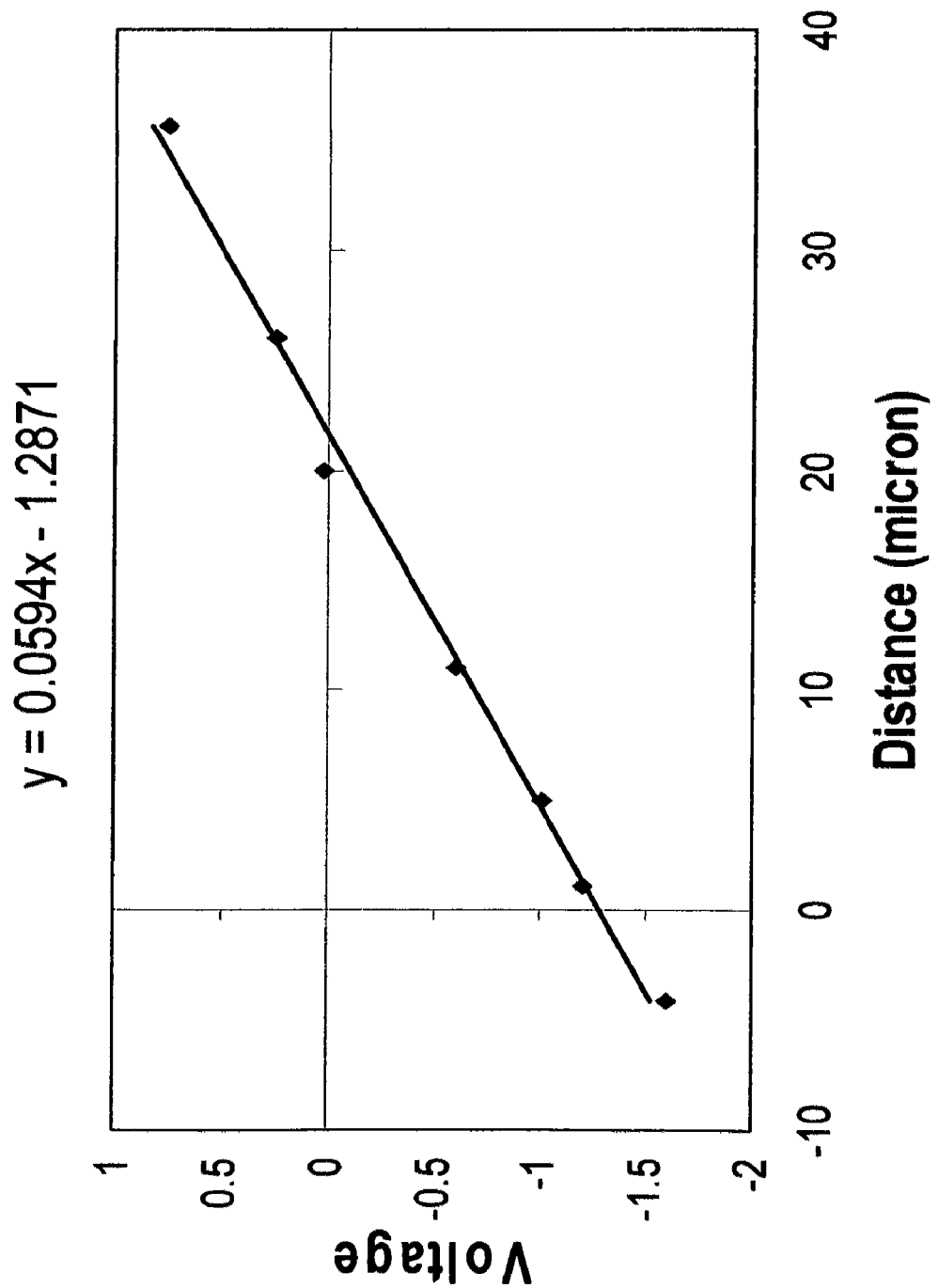
Figure 13:
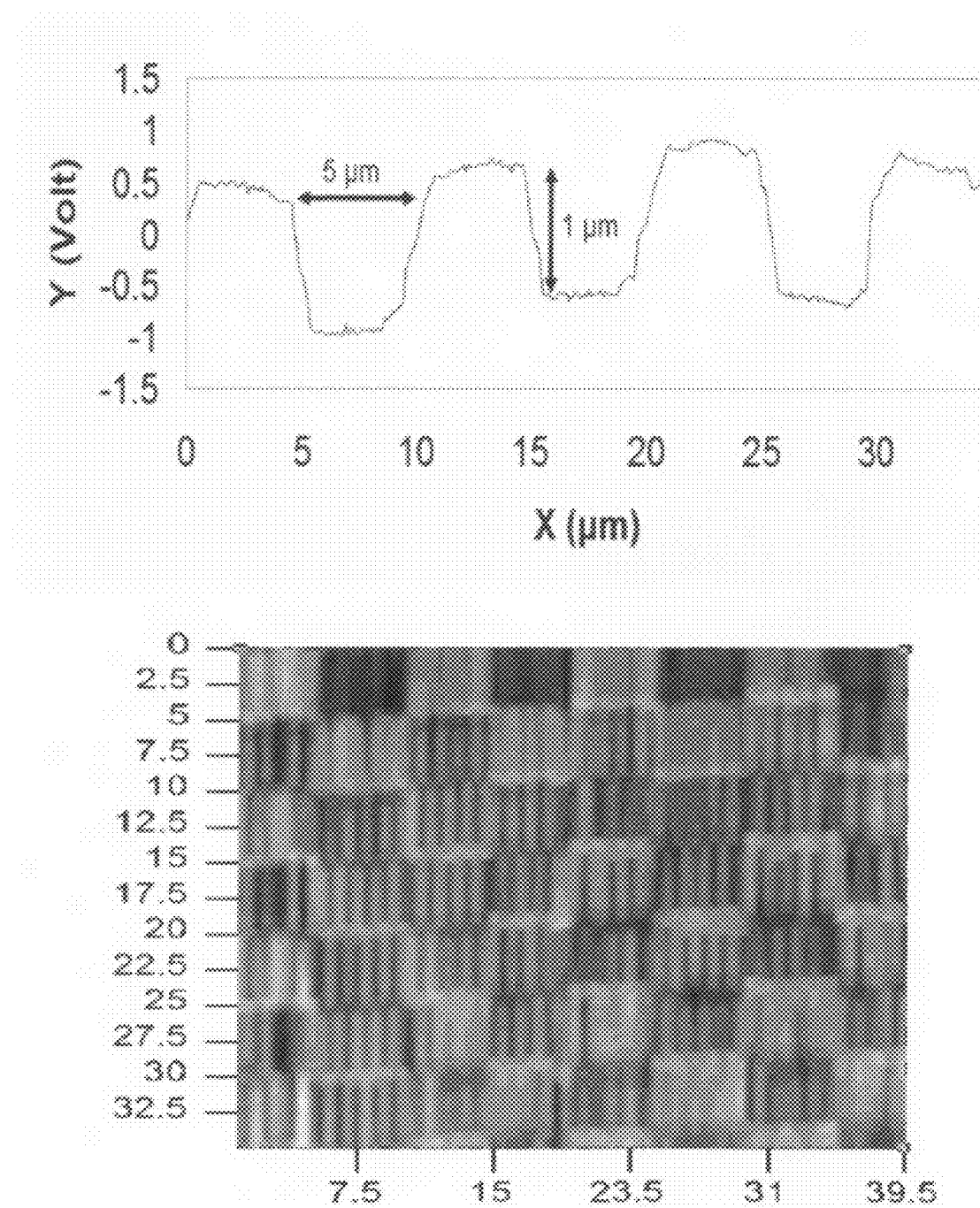

FIG. 13 (*a* and *b*) illustrate nano-indentation and viscoelastic measurements with these designs. These can be achieved by using the AFM's piezoelectric element to actuate or push and pull the tip. Alternatively, a piezoelectric layer can be added on the cantilever to actuate/move the cantilever, while the displacement is being recorded, using the thin film resistor. An external piezoelectric mechanism or other mechanism can be used to bring the probe in contact with the sample and move it in the Z-direction. Alternatively, a piezoelectric element may be embedded on the cantilever. This can be used to move the probe. This element can also be used to counteract the movement of the external piezo in order to compensate for the probe tip's lateral movement. This will make the tip remain in the same spot while measuring the softness/indentation of the surface of interest. Highly compliant probes with embedded resistors are ideal for indentation measurements. These probes are made of polymer materials or other materials with low spring constant and may also be very long to increase the compliance even further. This innovation allows for more indentation information.

FIG. 13 (*c*) illustrates a typical read out circuit used for scanning and indentation applications. The power to the bridge is supplied by a 1.5 V battery for lower noise and to avoid damaging the probes (high currents will damage the probe). The power can be adjusted using the potentiometer in Rc1 from 1.5 V to close to 0 Volts. The bridge arrangement contains 4 resistors. Two of which are probes. One probe is used as a reference, Rp1 is resting outside of the scanning area and will only be used on the bridge circuit to get the differential signal in order to eliminate changes in R due to heating of the cantilever because of the applied voltage (changes in R due to bimorph bending), the 2 probe resistors are connected in a symmetrical Wheatstone bridge configuration. The DC bias across the probe is adjusted by varying the resistor $R_{c1}$. Resistor $R_{c2}$ is used to vary the probe temperature. The bridge is balanced when equation below is satisfied, thereby making the error voltage $$(V_- - V_+) \text{zero} \cdot \frac{R_1}{R_p} = \frac{R_2}{R_{c2}}.$$

As the probe is scanned across the sample, the bridge, which was initially balanced, will be unbalanced because the probe resistance changes. The error voltage V+−V− across the two nodes of the bridge is amplified and fed to a PC that runs the software for reconstructing the image or profile of the sample. The signal goes through the first gain stage (where it is amplified by ×100), then through a low pass filter, and then through a second gain stage (where it is amplified by either ×10 or ×100), finally the signal goes through a buffer.

FIG. 13 (d) shows an example of calibration of the probe. The LT-9010 Keyence confocal meter was used to measure the response of the sensor element's resistance with bending. This system provides a 10 nm resolution. An open loop circuit like the one described above was used, this circuit used a bridge arrangement. The confocal laser beam was focused on the tip. A motorized stage was used. Since there is a natural tilt in the sample holder, by moving the stage the height of the cantilever changed. A glass slide was used to rest the tip. The distance change in microns was recorded using the confocal meter with the laser focus at the tip while a 34401A voltmeter from Hewlett-Packard was used to record the voltage change. There is a linear change in voltage and therefore in resistance with changes in height, which demonstrates that the probe can be used for measuring height changes. Two probes were used as described in the circuit section above, one as a reference and one in contact with the sample. There are a number of alternative ways to calibrate the probe. For instance, a piezoelectric z-axis stage can be used. These are already calibrated and the resistance change due to the bending of the tip can be plotted against the movement of the stage. An AFM/SPM can also be used to calibrate the displacement. Finally, a displacement meter either triangulation or confocal can be used.

FIG. 13 (e) illustrates topographical scans obtained with these probes. A piezo nanopositioning scanning stage by Physik Instrumente (PI), model P-517.3CL and E-710 controller, was used. The stage has a travel of 100 micron×100 micron×20 microns and a closed loop resolution of 1 nm. A labview DAQ card was used to obtain the voltage signal from the probe and the stage was controlled directly via a USB port. The top figure shows a 35 micron-line scan of a 10 micron pitch grating using a piezo-resistive probe to detect the probe's movement in the z-axis. The bottom scan is of a 35 micron×40 micron area obtained by using piezo-resistance to detect the probe movement. Scale is in micron. Resolution in the X direction is 100 nm and in the Y direction, 500 nm. Using the probes described above a number of successful three dimensional scans were obtained on a grating sample. The plot above is of a 35 micron ×40 micron area at 100 nm steps in the X direction at 500 micron steps in the Y, the speed was 10 micron/sec. The signal was amplified ×10,000.

Single Cell Elastography and Viscoelastic Material Properties

Research has shown that a large number of diseases such as osteoporosis, osteoarthritis, cystic fibrosis, muscular dystrophy, ventricular aneurysm, cancer, cirrhosis of the liver etc. exhibit abnormal tissue biomechanics [25]. There is a fast growing clinical interest in the ability to diagnose disease based on analysis of tissue mechanical properties. A number of indentation devices that have achieved minor clinical acceptance evaluate the stiffness of tissues quantitatively. Chief among them is the elastogram. An elastogram provides new information not available using conventional medical imaging methods because the image is constructed from regional differences of tissue responding to applied loads.

Atomic Force Microscopes (AFM) have been widely used as nano-indenters to measure the viscoelastic material properties of living cells in culture. With AFM elastography the structure and function of the underlying cell's cytoskeleton is examined from a map of the cell's mechanical properties which is produced by combining imaging and indentation. Although indentation experiments with AFM are very common, it is necessary to develop more sophisticated tests completely characterize cell properties.

Almost all physical, chemical and biological processes have an associated heat effect. The enabling technology proposed in the present invention provides a sensitive non-destructive diagnostic method to determine where and how much heat was exchanged following a physical or chemical process. The scanning deflection measurement probe disclosed in this invention can be used to research biological activity and structures both on the cell membrane and inside the cell. The scanning probe can facilitate studies relating to cancer and carcinogenic research. A critical application of the instrument is in understanding the biological basis of cancer at the cellular level by utilizing tumor cells and tissues to analyze the mechanisms responsible for the growth and progression of cancer.

Figure 14:
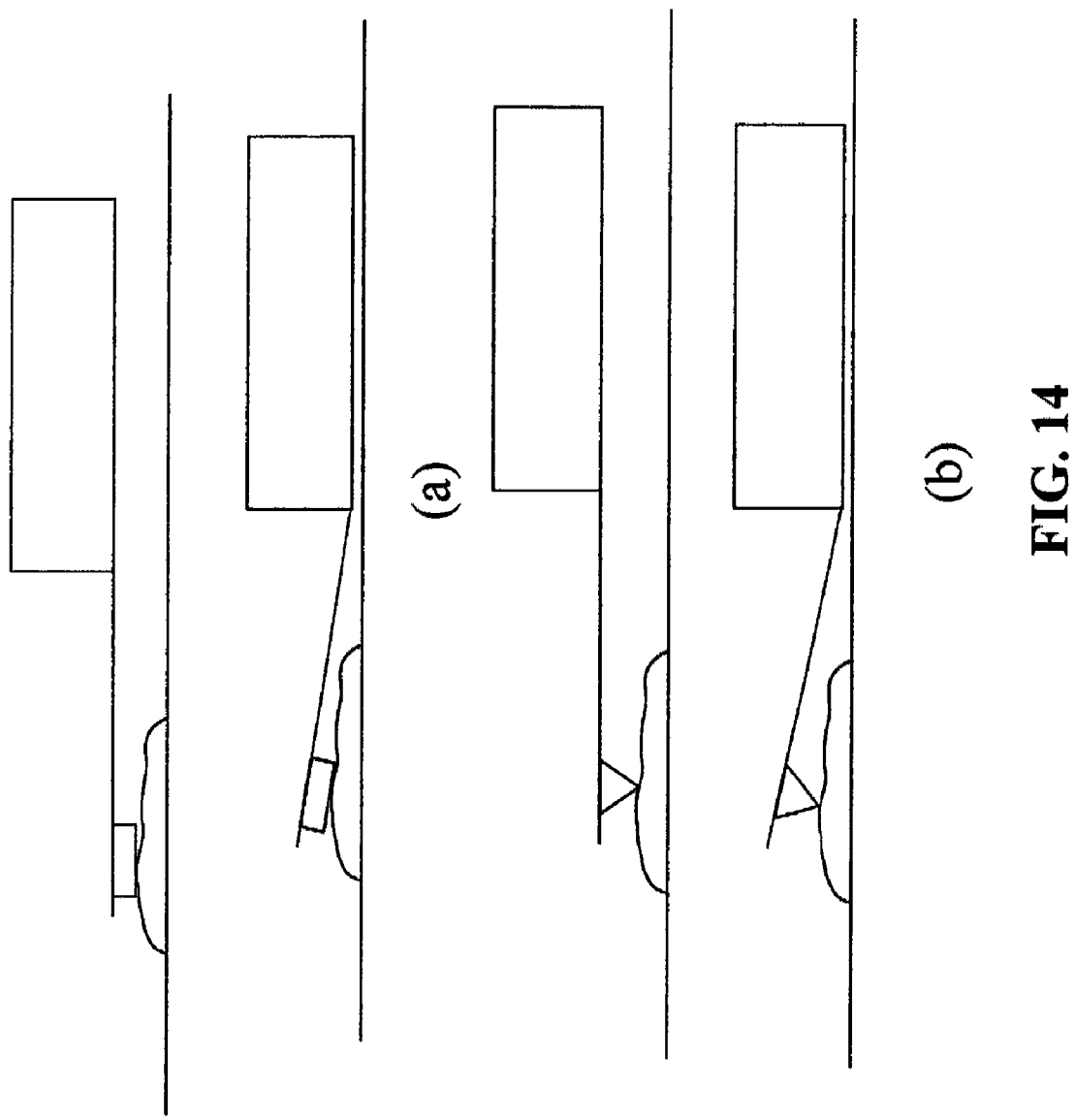
FIG. 14 illustrates probes with embedded resistors used for indentation.

FIG. 14 illustrates a probe with embedded resistors used for indentation. Two types of tips are shown, a sharp pyramid tip and a flat tip. The advantages provided by the proposed system, which includes a scanning probe, electronics, and specialized software are, 1) Combining thermal capability with ability to sense topographical variations and measure viscoelastic material properties. The probe and electronics will enable researchers for the first time to combine a number of important measurement capabilities in one probe. 2) Aqueous operation. Previously commercially available probes could not operate in aqueous environments because a) they electrically short out and b) they lose most of their heat to the surrounding water, greatly reducing signal strength. The probes of the present invention overcome these problems because a) insulating polymers are integral to the manufacturing process, b) the polymer cantilevers offer high thermal isolation c) scanning in liquid facilitates the real-time study of cellular features and living cells. 3) High sensitivity. Biological samples do not typically generate much heat, requiring a sensitive thermal probe. The probes of the present invention achieve high sensitivity by using a polymer structure with high thermal isolation. 4) High spatial resolution. The spatial resolution of the measurement is directly related to the tip diameter of the probe, <50 nm. 5) Does not damage cells. The probe is capable of scanning soft materials, minimizing damage due to ultra-high compliance (<0.08N/m) because the cantilever is made of polymers such as parelyne or polyimide. 6) Batch Fabrication. A microfabrication process is used to batch manufacture probes with predictable and repeatable performance. 7) Minimum sample preparation and prevention of self-destruction/autolysis of tissue. Simple sample preparation allows for preservation of tissue integrity. 8) High Throughput. Multiprobe technology will be used to increase analysis speeds. 9) Examine opaque materials. Light based techniques such as IR techniques cannot examine certain opaque materials. This problem is overcome using thermal probes of the present invention.

Explosive Detection

Recent events have exposed the urgent demand for reliable and inexpensive systems for remote detection of explosives. Among different explosives, plastic explosives such as PETN and RDX are the most difficult to detect because of their low vapor pressures. The difficulty is further aggravated for stand-off detection, as the concentration in the ambient air is even lower. Moreover, the detection has to be rapid enough to take at most a few seconds, when the false positives are limited. The device should be able to simultaneously detect different kinds of explosives, while operating in a field where both temperatures and chemical environment may vary significantly.

Recently, there has been considerable work in the area of microfabricated chemical sensors and systems for trace explosives detection. These microsystems can potentially enable low-cost and reliable handheld systems for explosive detection or wireless explosive sensing network for cargoes, buildings and other security purposes. Among the many different techniques, film based sensor arrays are commonly used for chemical detection. The structures of these sensor arrays are usually microfabricated nano-cantilevers that are coated with different sensor materials. When the sensing materials selectively adsorb the target chemicals, the mechanical characteristics of the nano-cantilevers such as bending, stress mass, and resonant frequency will change and can be detected with various methods. This technique can provide simultaneous rapid detection for various explosives at the fraction of the cost. In addition, this cantilever based detection is very promising due to its inherently high sensitivity and ease of fabrication and integration. The sensors are simple enough to be fabricated in a low-cost process and consequently have great potential to be implemented to a wireless explosive sensing network for explosive monitoring. Furthermore, the growth of Atomic Force Microscopy (AFM) technology has enabled the development of micro-cantilevers whose bending can be detected in exquisite resolutions.

Among the various kinds of cantilever sensors, devices made from polymeric material show the greatest sensitivity. The sensitivity of a piezoresistive cantilever is given by the equation:

$$\frac{\Delta R}{R} = \frac{4K}{Eh}\sigma$$

where K is the gauge factor, E is the Young's modulus, s is the uniform surface stress on the cantilever. The gauge factor for ultrathin films of gold (<10 nm thick) has been reported to be between, 24-48 [Li94]. Silicon nitride ($Si_3N_4$) and silicon are the common materials for micro and nanocantilevers. While the Young's moduli of silicon nitride and silicon are 180 GPa and 110 GPa, respectively, polyimide has a Young's modulus of 7.5 GPa and parylene has a Young's Modulus of 4 GPa. Piezoresistive microcantilevers provide an excellent platform for inexpensive and portable trace detection of explosives. Advantages include high sensitivity and linearity, ease of fabrication and calibration and good scalability to a multi-probe array and can be used for both static and dynamic measurements. Additionally, the piezoresistive measurement can be applied in different environments including in air and liquids, at low and high temperatures (−35° C.-200° C.) and does not require an ultraclean environment.

Nanocantilevers which can measure chemisorption down to 1 ag, and have a noise limited displacement sensitivity of 39 fm Hz-½ at atmospheric pressure have been demonstrated [Rou06]. While these results are excellent, it is possible to improve sensitivity further by using this polymer cantilever technology. The embodiment of the present invention embeds a sensor on a micro or nanocantilever that is made of an ultracompliant material such as polyimide or paralyne in order to measure the variation of the surface strain of the defected cantilever. This process is particularly suitable for mass production for sensor arrays. The use of arrays allows compensations for environmental changes and non-specific binding, consequently reduces false positives and provides a greater dynamic range.

Biomolecular Detection

Existing technologies such as ELISA and surface plasmon resonance spectroscopy (SPR) are inefficient in detecting the low abundance components in a mixture. These low abundance components may provide important information about the status of a cell. Small changes of concentration or altered modification patterns of disease-relevant low abundance components can be potentially used as markers of different stages of cancer, in diagnosis, in monitoring the growth of the tumor, and response to the therapy. Many disease biomarkers exist in the body in a very low concentration. Low-copy-number proteins (<1000 molecules/cell) have a significant function in cell operation, including signaling and regulation of gene expression. Their abundance is far below the sensitivity limits of current analysis methods.

Prior cantilever work has demonstrated the capability of detecting biomolecules with the cantilever sensors. However, the present invention aims at, a) advancing the sensing limits to detect low abundance biomolecules (×10 higher sensitivity than the existing cantilevers), b) shrinking the size of cantilevers to smaller than 1 micron dimensions in order to detect a small number of molecules. An embodiment of the present invention can be used for the detection of low abundance biomolecules using an array of nano-cantilevers made of parylene with embedded sensors on a microfluidic chip. The cantilevers are coated with the desired receptors to bind proteins, peptides or micro RNAs. Several innovations are included in this embodiment, including: 1) use of parylene to fabricate the cantilevers with at least ×10 higher sensitivity, 2) reduction of cantilever size to nanometer dimensions uniquely enabled by our proprietary fabrication techniques, 3) ultra thin metallic piezoresistive films increase sensitivity and eliminate the need of the atomic force microscopy (AFM) optical detection system, 4) address non-specific binding using a combination of strategies simultaneously. A massively parallel system for performing assays can be developed. This embodiment offers a platform technology which can provide quantitative information regarding a large number of different low-abundance proteins, peptides, and micro RNA under investigation using their specific binding receptor. Other components such as microfluidic channels, integrated microvalves or micropumps for flow control, sampling device with integrated cell lysis and filtration systems for sample preparation may be included. A lab-on-chip microfludic system, including manipulating, capturing, lysing cell and lysate analysis, can be fabricated for a single cell analysis. Based on the platform technology we can target multiple specific applications (for example, a low-cost PSA screening system).

The embodiments of the present invention can help researchers to develop or detect biomarkers for different cancers. The techniques of the present invention can be used for large-scale proteomic analysis for the simultaneous measurement of thousands of proteins, for fast screening of proteins for new drug targets, and for routine screening of drugs to determine possible side effects. The system of the present invention can rapidly analyze the response of the targeted biomolecules and consequently accelerate the research and test on the animal models used in drug development. In addition, several research areas such as virus detection and single cell analysis in a microfluidic chip can benefit from the improved sensing technique of the present invention. Point of care (POC) systems based on Lab-on-a-chip devices have been developed in the recent decades and provide clinicians a low cost solution to access to a wealth of information of the cancer tissue. The technology of the present invention enables better screening of different type of cancers or diseases. Further, the cost of this POC system is relatively low, and thus attractive for large-scale use in screening and disease prevention in a variety of contexts.

Piezothermal™ Probe

Figure 15:
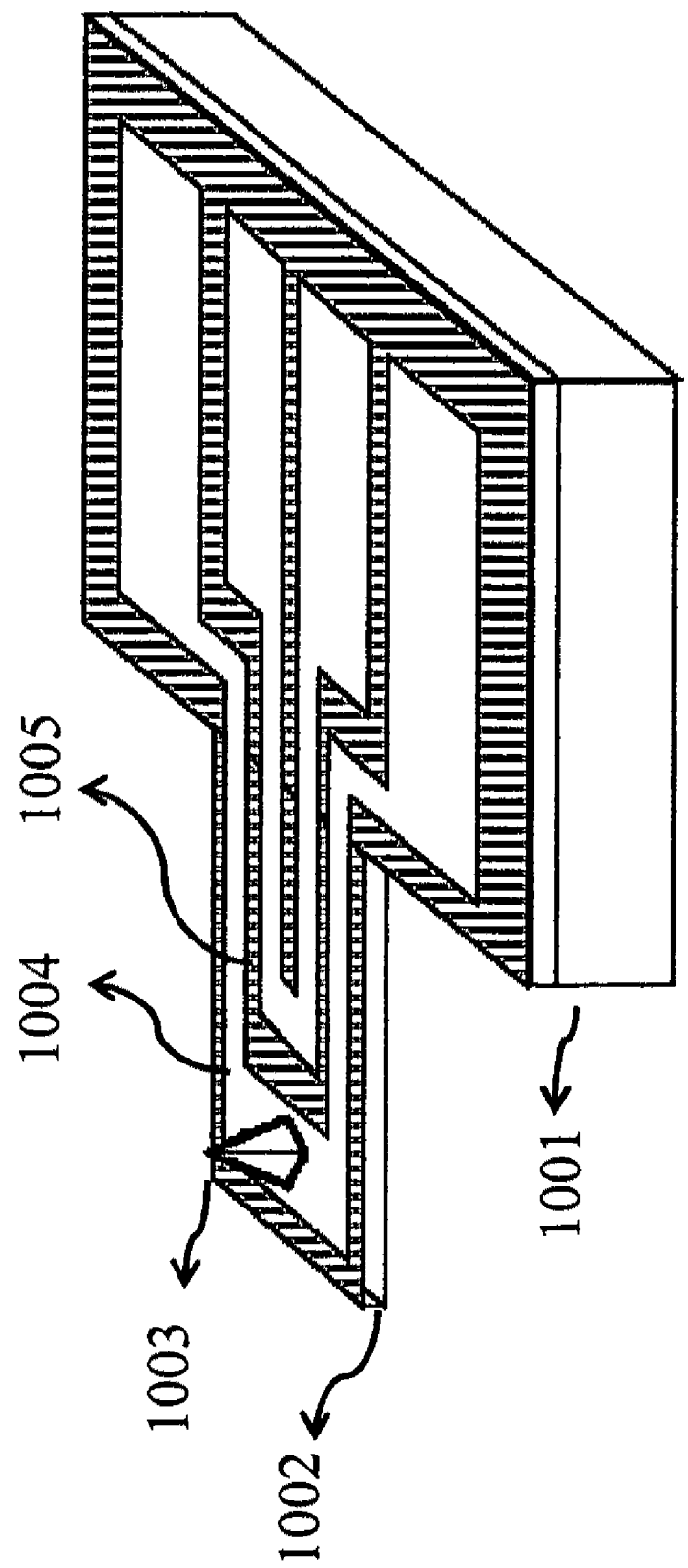
FIG. 15 (a-c) show various piezothermal probe designs.
Figure 15:
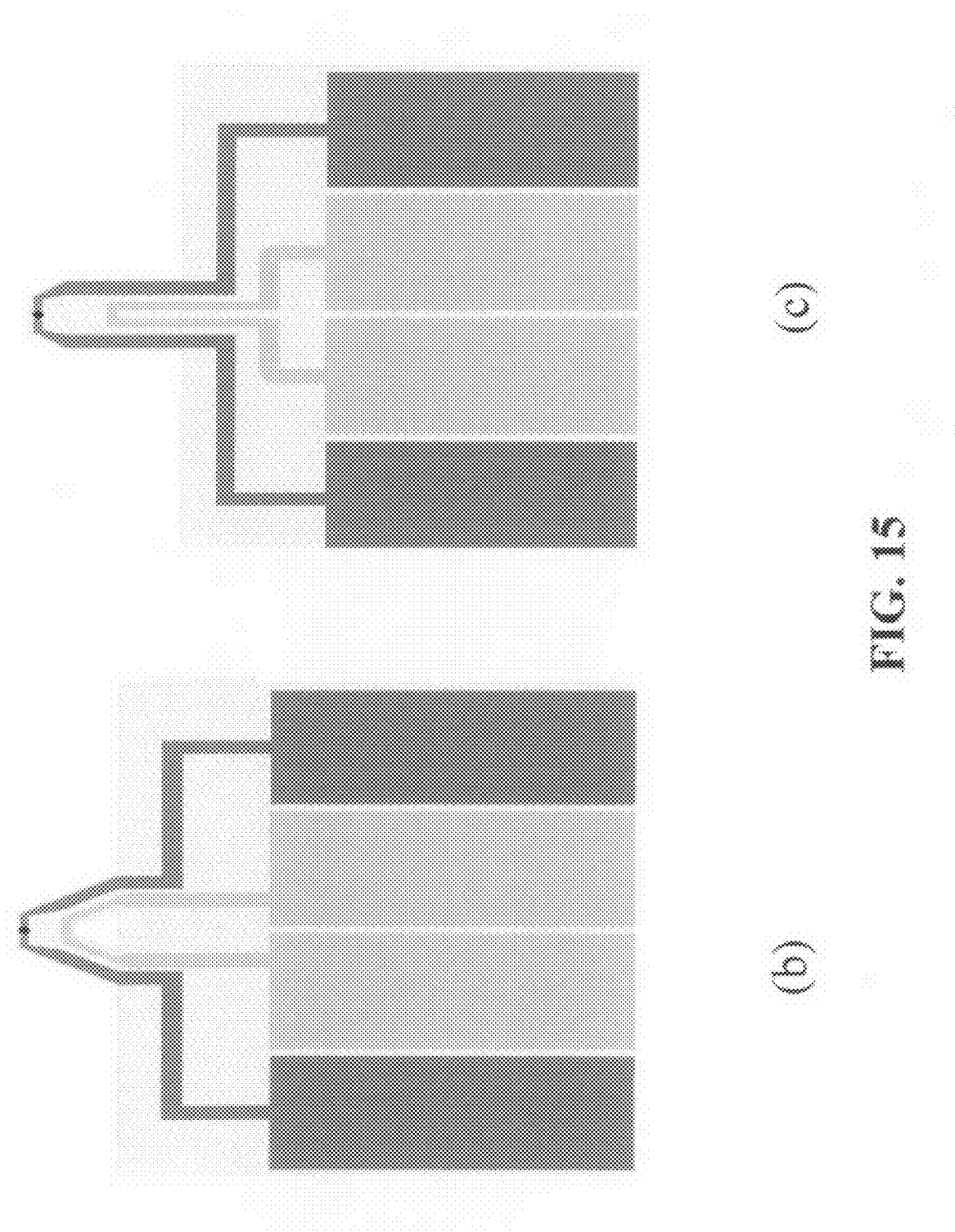

FIG. 15 (a) shows a piezothermal probe. Two metallic or semimetallic resistors are combined, one extending all the way to the edge of the cantilever and the other extending up to half the way or less, One resistor can sense heat changes or thermal changes and the other resistor can sense the cantilever bending. The resistors' thicknesses are such so that the sensing material is in the metal to insulator (MIT) or metal to semiconductor transition (MST) range. A chip 1001 supports a cantilever 1002 with a tip 1003. Metal resistor 1004 is designed to measure thermal properties as the tip scans over a surface. Metal resistor 1005 is designed to measure cantilever bending which relates to topography. 1005 could also be any kind of piezoresistor or piezoelectric element. However, in this embodiment a granular thin film at the MIT or MST is preferred. A piezoelectric element or some other type of actuator may be added eliminating the need for laser feedback required in an AFM.

This probe design of the invention can be used for thermo mechanical or thermo chemical patterning in contact or at a distance from the sample being patterned, in vacuum, air or other fluid. Similarly, this design can be used for static and dynamic thermomechanical analysis of localized regions of samples. In this application, the thermal element heats the tip 1003 when the probe is in contact with the sample. As the thermal element keeps increasing in temperature at a certain point it will melt the material under it. This will cause the cantilever to move; this movement can be detected and measured using a cantilever deflection detection mechanism. This mechanism can be the deflection element which is embedded on the cantilever 1005 or the laser optical lever of the AFM or SPM. This measurement allows the user to measure the melting point of a material. FIGS. 15 (b) and 15 (c) show additional designs of the "piezothermal" Probe™.

Alternative CNT Approach

Alternatively, an apparatus and a method for electromagnetic (EM) radiation detection (including radiation in the infrared/mid-IR/near-IR spectrum) can be facilitated by attaching a carbon nanotube (CNT) on a cantilever. The CNT contacts at least two separate electrically conductive traces formed by metal deposition or an implant process on the cantilever. A scanning stage, a light source, and instrumentation to synchronize and control the cantilevers may be used. The cantilever may also contain a bolometer in addition to the CNT. Joined bolometric and CNT detection may be used to calibrate the CNT's. In addition, blackbody radiation and ambient noise can be measured with the bolometer and cancelled out from the CNT measurement. Furthermore, a second CNT may be used as an emitter. CNT's can be used to emit light of certain frequency. This enables the use of a CNT emitter and a detector on the same cantilever. A Schottky contact is formed at the interface between the traces and the carbon nanotube. There are two Schottky contacts on each CNT. One of the two can be covered with a material that absorbs radiation of specific frequency. Since the contact area is submicron, the resolution is submicron and proportional to the contact area. In addition to single probes, the same structure can be made in the form of an array. EM radiation of certain wavelength is measured by measuring the change in resistance between the two traces, which corresponds to the absorption of certain wavelength by the CNT at the Schottky contact. These devices can be used as part of a scanning system to measure the specific IR spectra of a sample or simultaneous monitoring at various points of a sample, and correlate it to the horizontal movement of the cantilever on the sample. The device can also be mounted on a biopsy needle instead of a scanning stage, and used to monitor IR signals in vivo. Research has shown that cancerous cells have different IR signature compared to non-cancerous cells. An IR sensor mounted on a biopsy probe can act like the "eyes" inside the body and help the user to guide the probe to the location of the tumor.

Materials

If is preferred that the cantilevers be highly compliant, then the cantilever's body may comprise of one of many types of materials or a combination of materials such as photoresist, SU-8, and polymers such as poly(dimethylsiloxane) (PDMS), polyimide, parylene, and elastomers such as silicone and rubber. Cantilevers made from these materials have low spring constants and therefore are highly compliant. Other materials include any material used to make cantilever structures that has been use in the past. Probes made of these materials are ideal for indentation measurements for example for cell elastography. They are also ideal for soft specimen scanning such as live cell.

Cantilevers made of polymer or elastomers or other soft materials are also ideal for high speed scanning. In scanning probe microscopy when in contact mode, scanning cantilevers that are very compliant tend to "stick" to the surface and move with the topographical changes, much akin to a "wet noodle" dragged along the surface with a mirror on the top side. Laser response is ideal since it is very fast. This may allow even live cell imaging with great accuracy. Live cells tend to move so a high speed technique is very useful for this kind of imaging. In the embodiment of the present invention, as mentioned previously, a thermal or a displacement element is embedded in order to measure thermal or topographical changes or both. To achieve ultra high speeds in air and liquid, the user may need to first bring the probe in contact and then align the laser light and start scanning.

Metal or semimetal sensor may be made of antimony, gold, titanium, metals and semimetals including, but not limited to, Ag, Ni, Pt, Al, Cr, Pd, W, and metal alloys, such as Constantan, Karma, Isoelastic, Nichrome V, Pt—W, Pt—Cr, etc. Sensors may also be made of any type of thin film that exhibits MIT or MST at the temperatures of interest including vanadium dioxide (VO2).

The sensors described in the present invention may be combined with piezoelectric or other types of sensors and actuators. Piezoelectric materials include but are not limited to: berlinite (AlPO4), quartz, gallium orthophosphate, langasite, ceramics (such as PZT), sodium potassium niobate, polymers (such as polyvinylidene fluoride). For example, a piezoresistive sensor or a displacement sensor is combined with a piezoelectric actuator (active) on a cantilever. This cantilever can be used for atomic force microscopy applications or even material characterization applications.

Additional applications of these sensors include, a) Using the sensors as infrared spectrometers either on an AFM/SPM system or in some other arrangement, b) calorimetry, phase changes, and melting point measurement, c) modulating the temperature of a thermal probe to generate evanescent thermal waves in a material to thereby generate sub-surface images, d) static and dynamic thermomechanical analysis of localized regions of inhomogeneous samples, e) nano-heating using the thermal probe as a nanometer heater.

Figure 16:
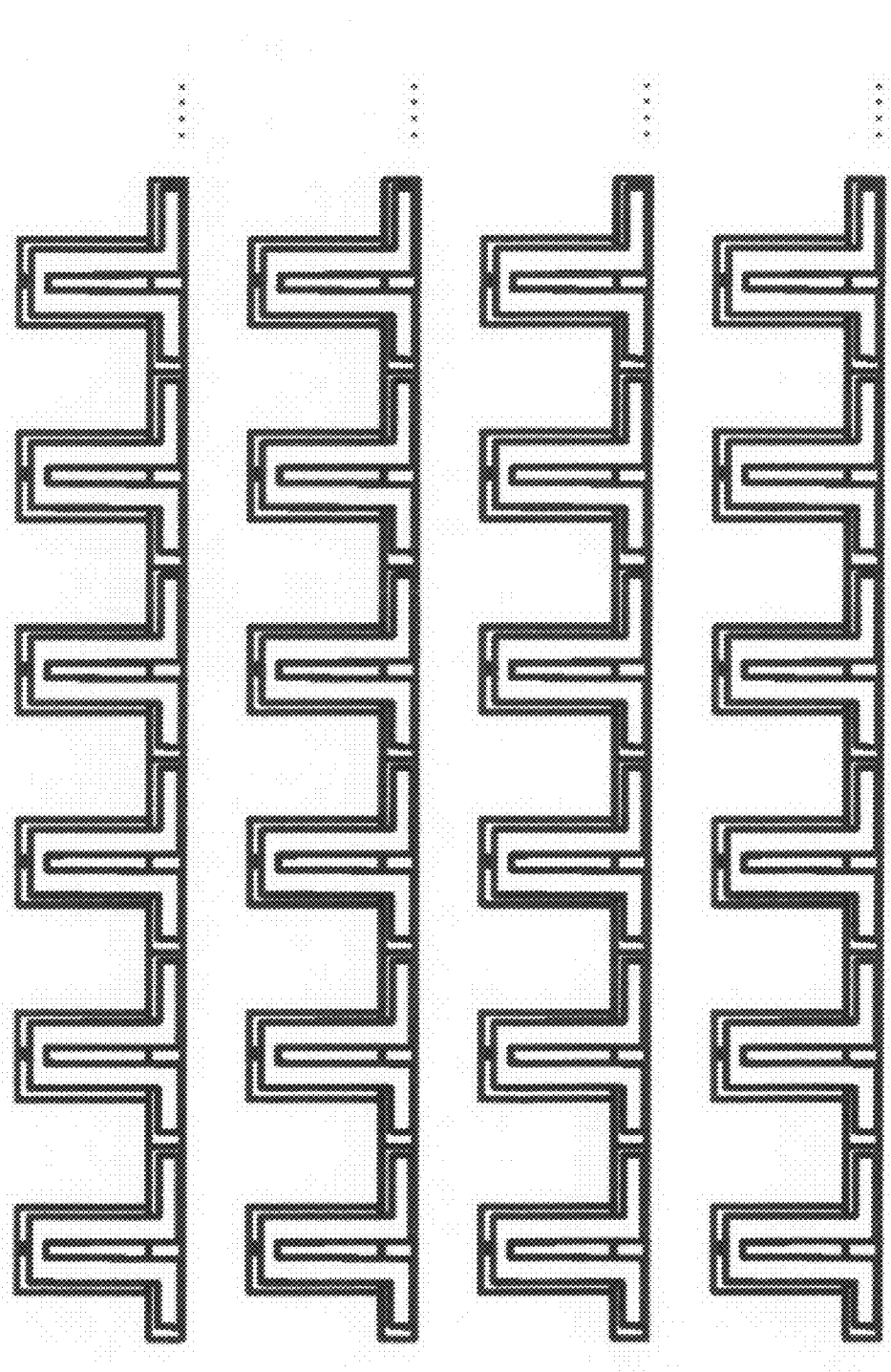
FIG. 16 illustrates a probe array.

FIG. 16 illustrates a probe array. An array may include probes with tips, thermal probes, displacement probes, IR probes, or a combination of these as described previously. These arrays may be mounted o an AFM or an SPM or any scanning system and operate in contact or at a distance from a sample.

The features and advantages of the present invention described in the embodiments are presented for illustrative purposes only and should not be construed to limit the scope of the invention. Many modifications and variations of these embodiments are possible. To illustrate, one can shrink the dimensions of the sensors and cantilevers to submicron features or smaller to nano-cantilevers. One or two or all three dimensions may be in the submicron range. For instance, a cantilever or a two or four anchored suspended beam made of any of the materials mentioned having length 1 micron, width 200 nanometers, and thickness 100 nanometers, with the sensor having a 5 nanometers thickness.

The concepts described in the present invention can be used for cantilevers, diaphragms, clamped beams, wires, etc. These sensors can be used for scanning probe microscopes, atomic force microscopes, flow sensors, force and pressure sensors, inertial sensors, such as accelerometers and motion transducers, chemical and biological sensors. As described above, chemical and biological sensors may include one or more cantilevers coated with a material that exclusively attaches to a chemical or biological compound.

While the invention has been thus been described with reference to the embodiments, it will be readily understood by those skilled in the art that equivalents may be substituted for the various elements and modifications made without departing from the spirit and scope of the invention.

It is to be understood that all technical and scientific terms used in the present invention have the same meaning as commonly understood by one of ordinary skill in the art to which this invention belongs.

REFERENCES

[1] C. Williams, H. Wickramasingh, SPIE 897, 129-34 (1988).
[2] M.-H. Li, Y. B. Gianchandani, Sensors and Actuators, A V 104, pp 236-245 (2003).
[3] A. Majumdar, Annu. Rev. Mater. Sci., V 29, pp. 505-585 (1999).
[4] R. Hull, Properties of Crystalline Silicon, (The Institution of Engineering and Technology, 1999), p. 426
[5] Selim Eminoglu, Deniz Sabuncuoglu Tezcan, M. Yusuf Tanrikulu, Tayfun Akin, Sensors and Actuators A 109, 102-113 (2003).
[6] Mohamed Henini, M. Razeghi, Handbook of infrared detection technologies, (Elsevier, 2002, ISBN 1856173887), p. 450.
[7] Hojun Ryu, Sang Hoon Cheon, Seong Mok Cho, Woo Seok Yang, Byoung Gon Yu, Chang Auck Choi, Myung Lae Lee, IEEE SENSORS 2008 Conference
[8] U.S. Pat. No. 5,450,053
[9] W. H. Block, O. L. Gaddy, IEEE Journal of Quantum Electronics, Vol. Qe-9, Ko. 1 I, (1973)
[10] B. W. Chui, T. D. Stowe, Y. S. Ju, K. E. Goodson, T. W. Kenny, H. J. Mamin, B. D. Terris, R. P. Ried, D. Rugar, Journal of Microelectromechanical Systems, Vol. 7, NO. 1 (1998).
[11] J. Lee, T. Beechem, T. L. Wright, B. A. Nelson, S. Graham, W. P. King, Journal of Microelectromechanical Systems, Vol. 15, No. 6 (2006).
[12] M.-H. Li and Y. B. Gianchandani, J. Vac. Sci. Technol., B 18(6), page 3600-3603 (2000).
[13] C J Adkins, J. Phys. C: Solid State Phys. 20, 235-244 (1987).
[14] R. Nowroozi-Esfahani and G. J. Maclay, J. Vac. Sci. Technol. A, 8 (4) 3591-3597 (1990).
[15] K. L. Chopra, Thin Film Phenomena, (McGraw-Hill, New York, 1979)
[16] J. W. Mattews, Epitaxial Growth Part B, (Academic Press, New York, 1983).
[17] C. A. Neugebauer and M. B, Webb, J. Appl. Phys., 33, 74 82 (1962).
[18] R. N. Esfahani, G. J. Maclay, G. W. Zajac, Thin Solid Films, 219, 257-265 (1992).
[19] J. Morris and T. Coutts, Thin Solid Films, 47, 1 65 (1977).
[20] K. Wetzig, C. M. Schneider, Metal Based Thin Films for Electronics, (Edition: 2, Published by Wiley-VCH, 2006, ISBN 3527406506), p. 69
[21] G. Bosman (editor), Proceedings of the 16$^{th}$ International Conference, Noise in physical systems and 1/f fluctuations, ICNF 2001, page 77
[22] A. Gaitas, Microscopy and Analysis SPM Supplement, S11, (2006)
[23] Mo-Huang Li, Ph.D. Thesis, University of Wisconsin-Madison (2001), p 83
[24] J.-H. Lee and Y. B. Gianchandani, IEEE/ASME Journal of Microelectromechanical Systems, 14(1), pp. 44-53, (2005)
[25] Kevin D. Costa, Single-cell elastography: Probing for disease with the atomic force microscope, Disease Markers 19, 2004, 139-154 139

What is claimed is:

1. An apparatus comprising:
an insulating substrate;
a bolometer detector element deposited on said insulating substrate, said detector element possesses the following properties: a) said detector element is a metal or a semimetal thin film, b) said detector element has a negative temperature coefficient of resistance below −0.007 per Kelvin, c) said detector element has a thickness below 5 nanometers, d) said detector element has a sheet resistance larger than 50 kilo-ohms per square, e) said detector element is at the crossover of the metal-insulator-transition regime, f) the plot of current (in the vertical axis) and voltage (in the horizontal axis) of said detector element is superlinear; and
electrical conductors connecting to said detector element.

2. The apparatus according to claim 1, wherein said detector element is one selected from the group consisting of: semimetals, antimony, metals, titanium, tungsten, metal oxides, and gold.

3. The apparatus according to claim 1, wherein said insulating substrate rests on a cantilever anchored at one end and free at the other end.

4. The apparatus according to claim 1, wherein said insulating substrate is one selected from the group consisting of: silicon oxide, silicon nitride, polymer, parylene, polyimide, and SU-8.

5. The apparatus according to claim 1, wherein said electrical conductor possesses the following properties: a) said electrical conductor is a metal or semimetal thin film, b) said electrical conductor has a temperature coefficient of resistance between (negative)-0.000001 per Kelvin and (positive) 0.000001 per Kelvin, c) said electrical conductor is at the crossover of the metal-insulator-transition regime, d) the plot of current (in the vertical axis) and voltage (in the horizontal axis) of said electrical conductor is linear, e) said electrical conductor has a thickness less than 20 nanometers.

6. An apparatus comprising:
an insulating substrate;
a displacement detector element deposited on said insulating substrate; said detector element possesses the following properties: a) said detector element is a metal or a semimetal thin film, b) said detector element has a thickness below 10 nanometers, c) said detector element has a sheet resistance larger than 0.5 kilo-ohms per square, d) said detector element is at the crossover of the metal-insulator-transition regime, e) the plot of current (in the vertical axis) and voltage (in the horizontal axis) of said detector element is superlinear; and electrical conductors connecting to said detector element.

7. The apparatus according to claim 6, wherein said detector element is one selected from the group consisting of: semimetals, antimony, metals, titanium, tungsten, metal oxides, and gold.

8. The apparatus according to claim 6, wherein said insulating substrate rests on a cantilever anchored at one end and free at the other end.

9. The apparatus according to claim 6, wherein said insulating substrate is one selected from the group consisting of: silicon oxide, silicon nitride, polymer, parylene, polyimide, and SU-8.

10. The apparatus according to claim 6, wherein said electrical conductor possesses the following properties: a) said electrical conductor is a metal or semimetal thin film, b) said electrical conductor has a temperature coefficient of resistance between (negative)-0.000001 per Kelvin and (positive) 0.000001 per Kelvin, c) said electrical conductor is at the crossover of the metal-insulator-transition regime, d) the plot of current (in the vertical axis) and voltage (in the horizontal axis) of said electrical conductor is linear, e) said electrical conductor has a thickness less than 20 nanometers.

* * * * *